(12) United States Patent
Lee et al.

(10) Patent No.: US 10,473,962 B2
(45) Date of Patent: Nov. 12, 2019

(54) MOTHER SUBSTRATE FOR DISPLAY PANEL, METHOD OF CUTTING THE SAME, AND DISPLAY PANEL PREPARED BY THE METHOD

(71) Applicant: Samsung Display Co., Ltd., Yongin-si (KR)

(72) Inventors: Jong Hwan Lee, Seoul (KR); Tae Hwan Kim, Yongin-si (KR); Myung Hwan Park, Suwon-si (KR); Jean Ho Song, Yongin-si (KR); Jeong Ho Lee, Seoul (KR)

(73) Assignee: Samsung Display Co., Ltd, Yongin-si (KR)

(*) Notice: Subject to any disclaimer, the term of this patent is extended or adjusted under 35 U.S.C. 154(b) by 0 days.

(21) Appl. No.: 15/440,378

(22) Filed: Feb. 23, 2017

(65) Prior Publication Data
US 2017/0248817 A1 Aug. 31, 2017

(30) Foreign Application Priority Data
Feb. 29, 2016 (KR) .................. 10-2016-0024016

(51) Int. Cl.
*G02F 1/1333* (2006.01)
*G02F 1/1339* (2006.01)
(52) U.S. Cl.
CPC .... *G02F 1/133351* (2013.01); *G02F 1/13394* (2013.01)

(58) Field of Classification Search
CPC .......... G02F 1/133351; G02F 1/13394; G02F 1/13336; G02F 1/1347; G02F 1/1303;
(Continued)

(56) References Cited

U.S. PATENT DOCUMENTS 6,239,855 B1 * 5/2001 Nakahara .............. G02F 1/1339
349/153
6,778,248 B1 8/2004 Ootaguro et al.
(Continued)

FOREIGN PATENT DOCUMENTS

JP 2014-191129 10/2014
KR 10-1999-0024038 3/1999
(Continued)

*Primary Examiner* — Shan Liu
(74) *Attorney, Agent, or Firm* — H.C. Park & Associates, PLC

(57) ABSTRACT

A display panel includes a display area, a non-display area, a first substrate with first and second edges extending in first and second directions and forming a vertex, a second substrate facing the first substrate, a seal pattern between the first and second substrates to surround a display area with first and second seal patterns extending in the first and second directions and forming a vertex, and dummy spacers disposed on the first substrate within the non-display area. The non-display area includes a first non-display area between the first seal pattern and the first edge, a second non-display area between the second seal pattern and the second edge, a vertex area that abuts on the first and second non-display areas and is adjacent to the vertex of the first substrate, and an average arrangement density of the dummy spacers is smaller in the vertex area than in the non-display area.

10 Claims, 24 Drawing Sheets

(58) Field of Classification Search
CPC .... G02F 1/0107; G02F 1/1339; G02F 1/1341; G02F 1/161; G02F 1/13392; G02F 1/133377; G02F 2001/13396; G02F 2001/13398; H01L 27/3246
USPC .................. 349/73–74, 187, 153, 155–157
See application file for complete search history.

(56) References Cited

U.S. PATENT DOCUMENTS

| | | | | |
|---|---|---|---|---|
| 2003/0123016 | A1* | 7/2003 | Kim | G02F 1/1339 349/153 |
| 2004/0160568 | A1* | 8/2004 | Kim | G02F 1/1339 349/156 |
| 2005/0200799 | A1* | 9/2005 | Murai | G02F 1/1339 349/156 |
| 2005/0253994 | A1* | 11/2005 | Kamijima | G02F 1/133351 349/155 |
| 2006/0152668 | A1* | 7/2006 | Jang | G02F 1/1339 349/156 |
| 2008/0273158 | A1* | 11/2008 | Jung | G02F 1/1339 349/153 |
| 2009/0207370 | A1* | 8/2009 | Tsuchiya | G02F 1/1339 349/153 |
| 2011/0090443 | A1* | 4/2011 | Han | G02F 1/1339 349/124 |
| 2012/0268708 | A1* | 10/2012 | Chida | G02F 1/133351 349/153 |
| 2013/0242242 | A1* | 9/2013 | Saida | G02F 1/1345 349/113 |
| 2013/0335686 | A1* | 12/2013 | Chen | G02F 1/1335 349/106 |
| 2014/0132910 | A1* | 5/2014 | Dong | G02F 1/13394 349/155 |
| 2014/0168916 | A1* | 6/2014 | Nagaoka | G02F 1/1339 361/752 |
| 2014/0293212 | A1 | 10/2014 | Osaki et al. | |
| 2016/0026017 | A1* | 1/2016 | Wang | G02F 1/133351 349/139 |
| 2016/0266432 | A1* | 9/2016 | Tamatani | G02F 1/13394 |

FOREIGN PATENT DOCUMENTS

| | | |
|---|---|---|
| KR | 10-2001-0020855 | 3/2001 |
| KR | 10-2003-0089188 | 11/2003 |
| KR | 10-2006-0119120 | 11/2006 |

* cited by examiner

MOTHER SUBSTRATE FOR DISPLAY PANEL, METHOD OF CUTTING THE SAME, AND DISPLAY PANEL PREPARED BY THE METHOD

This application claims priority from and the benefit of Korean Patent Application No. 10-2016-0024016, filed on Feb. 29, 2016, which is hereby incorporated by reference for all purposes as if fully set forth herein.

BACKGROUND

Field

Exemplary embodiments relate to a mother substrate for a display panel, a method of cutting the mother substrate for the display panel, and a display panel manufactured by the method of cutting the mother substrate.

Discussion of the Background

In order to improve the yield in the manufacture of a display panel, a mother substrate with a large area including an upper substrate and a lower substrate is manufactured, and thereafter, the mother substrate is cut into a plurality of unit panels having a smaller area, thereby manufacturing the display panel. A method for cutting the mother substrate, such as a scribe and break process, may be adopted.

For example, after forming a scribing line, i.e., a crack on the surfaces of the upper substrate and the lower substrate of the mother substrate may be made by a cutter, the mother substrate may be cut by applying a uniform impact or load to the scribing line, and thus a unit panel of a desired size may be manufactured.

The above information disclosed in this Background section is only for enhancement of understanding of the background of the inventive concept, and, therefore, it may contain information that does not form the prior art that is already known in this country to a person of ordinary skill in the art.

SUMMARY

As the thicknesses of the upper substrate and the lower substrate become gradually thinner, in order to reduce the weight and thickness of the display device, the upper substrate and/or lower substrate may be bent in the process of forming the scribing line using a cutter. Thus, there is a problem of an occurrence of cracks in an unintended direction, e.g., cracks which make the scribing line uneven.

Furthermore, when there are cracks along the uneven scribing line, impurities such as debris and dust may be generated due to the uneven cut surface, and defective pixels of the display panel may be caused by such impurities. In addition, such a failure may increase with an increase in the area of the mother substrate.

Exemplary embodiments provide a mother substrate and a method for forming a uniform scribing line for cutting the mother substrate.

Exemplary embodiments provide a display panel in which the defective pixel caused by impurities generated in the process of cutting the mother substrate is minimized.

Additional aspects will be set forth in the detailed description which follows, and, in part, will be apparent from the disclosure, or may be learned by practice of the inventive concept.

According to an exemplary embodiment of the present disclosure, a display panel includes a display area comprising a plurality of pixels, a non-display area surrounding the display area, a first substrate comprising a first edge extending in a first direction, a second edge extending in a second direction which intersects with the first direction and forms a vertex with the first edge, a second substrate that faces the first substrate, a seal pattern that comprises a first seal pattern extending in the first direction, and a second seal pattern which extends in the second direction and forms a vertex with the first seal pattern, the seal pattern being located between the first substrate and the second substrate and surrounding the display area, and one or more dummy spacers disposed on the first substrate within the non-display area. The non-display area includes a first non-display area between the first seal pattern and the first edge, a second non-display area between the second seal pattern and the second edge, a vertex area that abuts on the first non-display area and the second non-display area and is adjacent to the vertex of the first substrate, and an average arrangement density of the dummy spacers in the vertex area is smaller than an average arrangement density of the dummy spacers in the non-display area or 0.

According to another exemplary embodiment of the present disclosure, the mother substrate includes a plurality of active areas arranged in a matrix form, a grid-shaped surrounding area of the active areas, a second substrate that faces the first substrate to be spaced apart, a plurality of seal pattern that is located between the first substrate and the second substrate and surrounds each of the active areas, and a plurality of dummy spacers disposed on the first substrate within the surrounding area. The surrounding area includes a first surrounding area which extends in the first direction and a second surrounding area which extends in a second direction intersecting with the first direction, wherein an average arrangement density of the dummy spacers in an area in which the first surrounding area and the second surrounding area intersect with each other is smaller than an average arrangement density of the dummy spacers in the surrounding area or 0.

According to yet another exemplary embodiment of the present disclosure, a method of cutting a mother substrate includes preparing a mother substrate. The mother substrate includes a plurality of active areas arranged in matrix form, a grid-shaped surrounding area of the active areas, a first substrate, a second substrate that faces the first substrate to be spaced apart, and a plurality of dummy spacers disposed on the first substrate within the surrounding area. The surrounding area includes a first surrounding area which extends in the first direction and a second surrounding area which extends in a second direction intersecting with the first direction, wherein an average arrangement density of the dummy spacers in an area in which the first surrounding area and the second surrounding area intersect with each other is smaller than an average arrangement density of the dummy spacers in the surrounding area. The method also includes forming a first scribing line extending in the first direction on one side of the second substrate within the first surrounding area and forming a second scribing line extending in a second direction intersecting with the first direction on one side of the second substrate within the second surrounding area, wherein upon forming the second scribing line, forming the second scribing line so that an intersection in which the second scribing line and the first scribing line intersect with each other is located within an area in which the first surrounding area and the second surrounding area intersect with each other.

According to the mother substrate, and method of cutting the mother substrate according to an exemplary embodiment of the present disclosure, by disposing one or more dummy spacers in a surrounding area of the mother substrate, and by forming a scribing line on one side of the substrate to overlap the dummy spacers or to penetrate between the two dummy spacers contiguously spaced apart from each other, there is an effect capable of alleviating the bending of the substrate in the process of forming the scribing line, thereby suppressing the cracks that occur in the horizontal direction with respect to the substrate surface.

At the same time, by setting an average arrangement density of the dummy spacers in an cross area of the surrounding area of the mother substrate to be smaller than an average arrangement density of the dummy spacers within an entire surrounding area, or by forming the intersection of a plurality of scribing lines to overlap the cross area without disposing the dummy spacer in the cross area, it is possible to improve the uniformity of the scribing line in the vicinity of the intersection.

Further, by suppressing the generation of the impurities to a minimum in the cutting process of the mother substrate, it is possible to provide a display panel with improved reliability.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
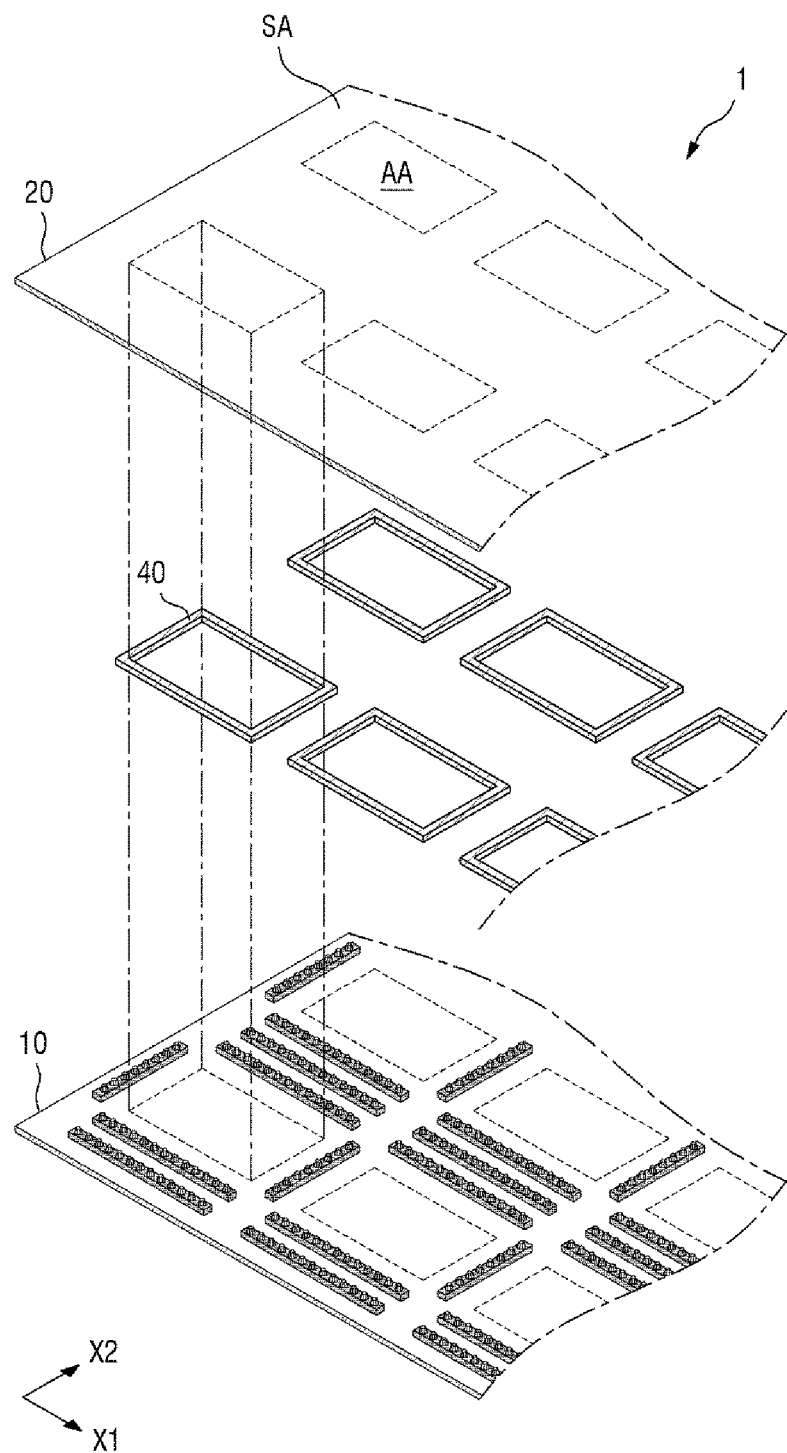
FIG. 1 is an exploded perspective view of a mother substrate according to an embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
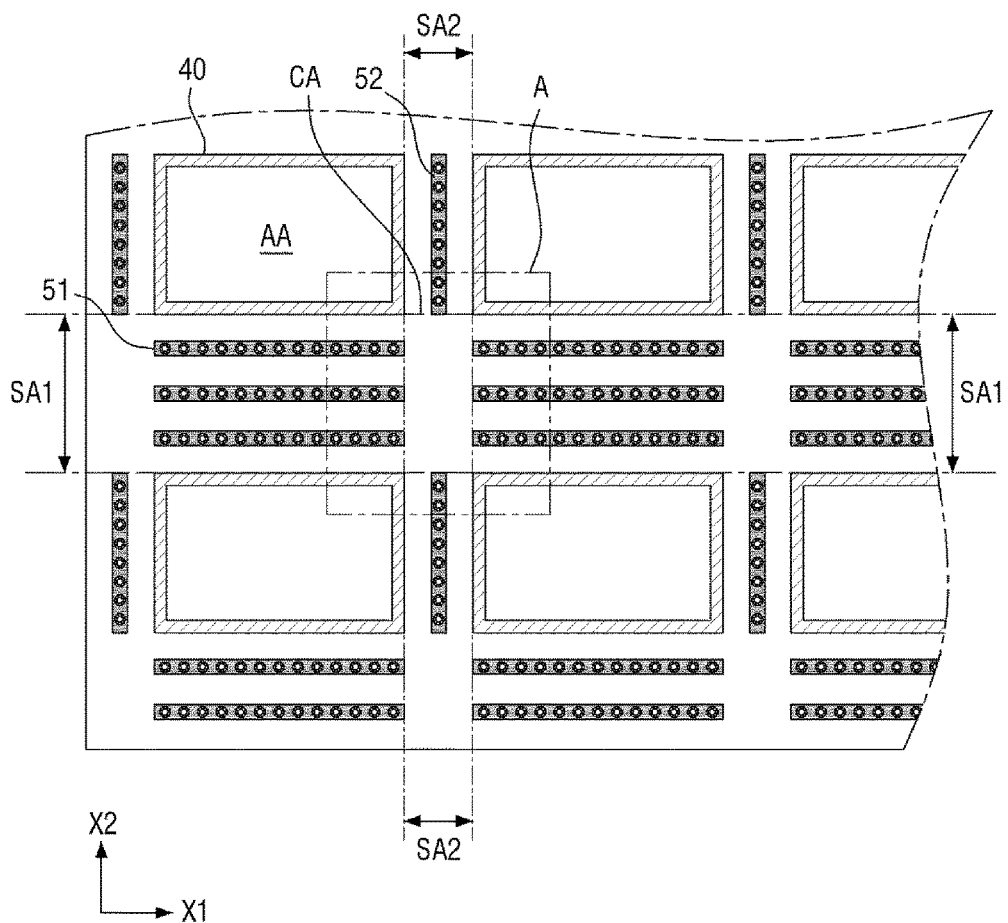
FIG. 2 is a layout diagram of the mother substrate of FIG. 1.

FIG. 1 is an exploded perspective view of a mother substrate according to an embodiment of the present disclosure. FIG. 2 is a layout diagram of a mother substrate of FIG. 1.

Referring to FIGS. 1 and 2, a plurality of active areas AA and a surrounding area SA are defined on the mother substrate 1. The active area AA is an area that includes a plurality of pixel areas to achieve an image, and the surrounding area SA is a surrounding area that surrounds the active areas AA.

The plurality of active areas AA may be aligned in a first direction (X1, a row direction) and a second direction (X2, a column direction) and is disposed in a substantially matrix form, and the first direction X1 and the second direction X2 may be orthogonal to each other. Each active area AA may include a plurality of pixel areas, and a pixel electrode is disposed for each pixel area. The active areas AA of the mother substrate 1 may correspond to the display area of the display panel.

The surrounding area SA may be an area that excludes an area occupied by the active areas AA from the mother substrate 1. The surrounding area SA may include an area (not illustrate) in which a circuit pattern for providing an electrical signal to the pixel electrode of the active area AA, and an area in which a scribing line to be described later is formed. When a plurality of active areas AA is disposed in a matrix form, the surrounding area SA may be an area in the grid form that is formed by a plurality of first surrounding areas SA1 extending in the first direction X1 and a plurality of second surrounding areas SA2 extending in the second direction X2. A single first surrounding area SA1 and a single second surrounding area SA2 may intersect with each other to define a cross area CA.

The mother substrate 1 may include a first substrate 10 including a plurality of dummy spacers 51 and 52, a second substrate 20 that faces the first substrate 10 to be spaced apart from each other, and a plurality of seal patterns 40 which is located between first substrate 10 and the second substrate 20.

In an exemplary embodiment, the second substrate 20 may be a substrate that includes a second base substrate (not illustrated) and the pixel electrode disposed on the second base substrate, and the first substrate 10 may be a counter substrate that includes a first base substrate (not illustrated) and dummy spacers 51 and 52 and is disposed to face second substrate 20 to be spaced apart from each other.

A plurality of seal patterns 40 may be located between the first substrate 10 and the second substrate 20. The seal patterns 40 may be a sealing member for bonding the first substrate 10 and the second substrate 20 together. Specifically, a single seal pattern 40 may have a square band shape that is located in the surrounding area SA to surround the single active area AA. In each active area AA that is sealed by the first substrate 10, the second substrate 20, and the seal pattern 40, elements for obtaining an image, e.g., one or more thin film transistors, one or more pixel electrodes, a liquid crystal, and/or an organic light emitting element may be disposed.

The plurality of dummy spacers 51 and 52 may be disposed in the surrounding area SA. The plurality of dummy spacers may alleviate the problem of bending of the first substrate and the second substrate bend, in the process of forming a scribing line to be described later, by maintaining a separated distance between the first substrate 10 and the second substrate 20. The function of the dummy spacer will be described below in detail with FIGS. 11 to 17 relating to the method of cutting the mother substrate.

The plurality of dummy spacers may include one or more first dummy spacers 51 that are located in the first surrounding area SA1 and extend approximately in the first direction X1, and one or more second dummy spacers 52 that are located in the second surrounding area SA2 and extend approximately in the second direction X2. FIGS. 1 and 2 illustrate a case where the three first dummy spacers 51 spaced apart in the second direction X2 in the first surrounding area SA1 are repeatedly disposed in the first direction X1, and a single second dummy spacer 52 disposed in a single second surrounding area SA2 is repeatedly disposed in the second direction X2. However, the present disclosure is not limited thereto, and the number of the first and second dummy spacers may be provided by being modified. In another exemplary embodiment, a plurality of dummy spacers may be disposed on the substrate on which the pixel electrode is disposed.

Figure 3:
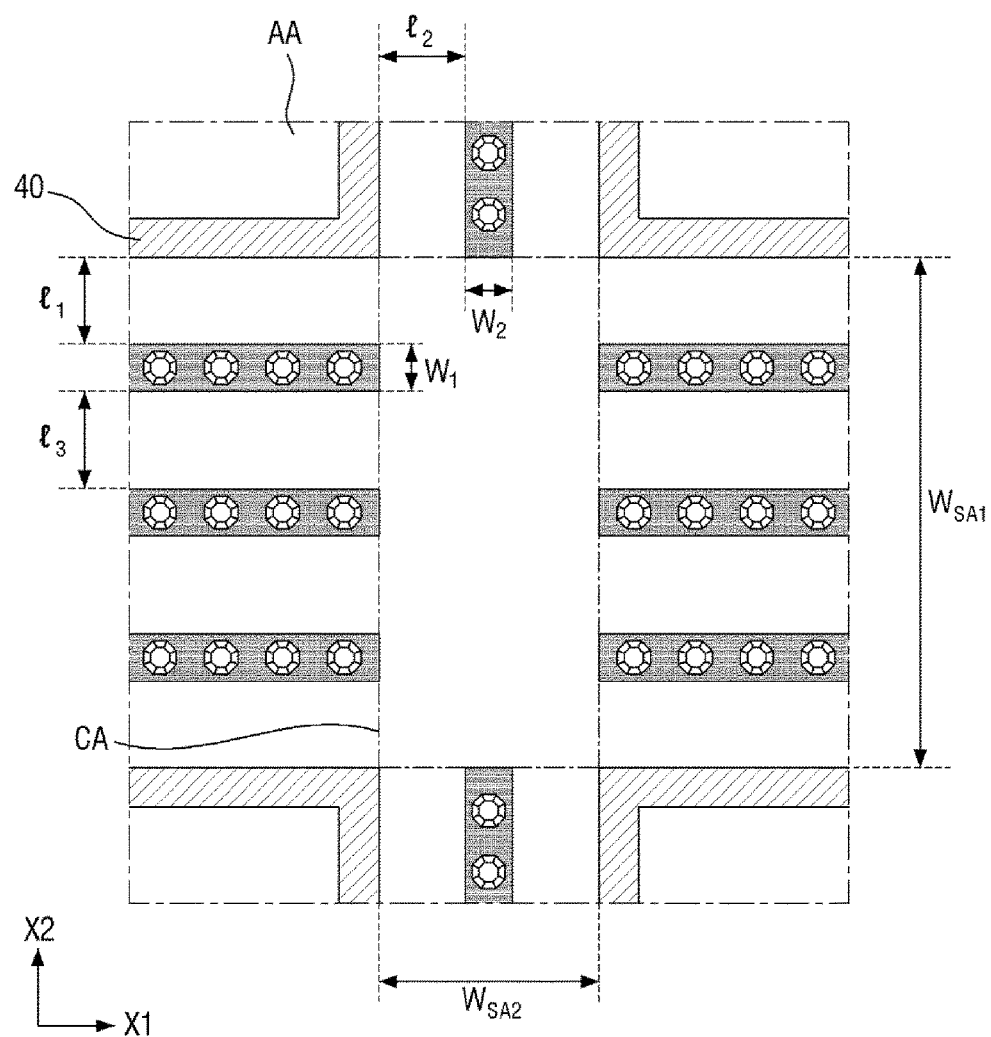
FIG. 3 is an enlarged layout diagram of an area A of FIG. 2.
Figure 4:
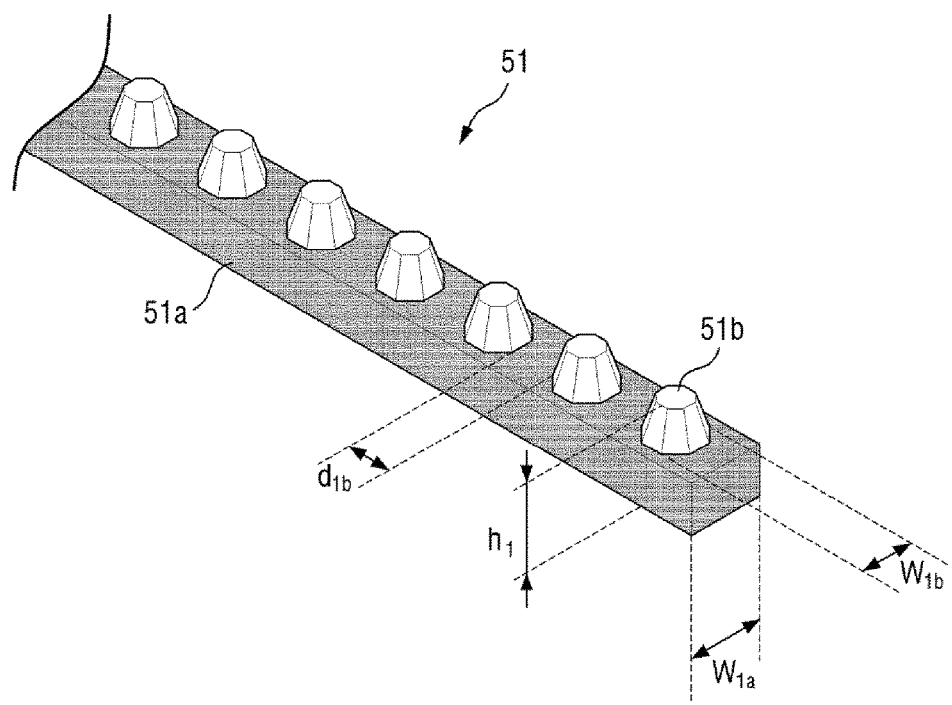
FIG. 4 is an enlarged perspective view of a dummy spacer of FIG. 3.

Hereinafter, the shape and arrangement of the components of the mother substrate 1 according to an exemplary embodiment of the present disclosure will be described in detail with reference to FIGS. 3 and 4. FIG. 3 is an enlarged layout diagram of an area A of FIG. 2. FIG. 4 is an enlarged perspective view of the dummy spacer of FIG. 3.

Referring to FIGS. 1 to 4, the cross area CA may be an area of an approximately square shape. In this case, the length in the first direction (X1, a horizontal direction) of the cross area CA may correspond to the width of the second surrounding area SA2, and the length in the second direction (X2, a vertical direction) of the cross area CA may correspond to the width of the first surrounding area SA1.

In an exemplary embodiment, a length $W_{SA2}$ in the first direction X1 of the cross area CA may be approximately 4 mm or more, or approximately 8 mm or more, and a length $W_{SA1}$ in the second direction X2 may be approximately 4 mm or more, or approximately 8 mm or more. That is, the cross area CA may include an area of a square shape in which the length of one side is 4 mm or more.

Further, an average arrangement density of the dummy spacers 51 and 52 in the cross area CA may be zero. That is, the dummy spacers 51 and 52 may not be located in the cross area CA. In this example, the average arrangement density of the dummy spacers means the ratio of the area on a plane occupied by the dummy spacers to the unit area on the plane. Specifically, the first dummy spacers 51 may extend in the first direction X1 within the first surrounding area SA1, and the second dummy spacers 52 may extend in the second direction X2 within the second surrounding area SA2, but the first dummy spacers 51 and the second dummy spacers 52 may be spaced apart from each other, without intersecting with each other. The extension length of the first dummy spacers 51 may be substantially the same as the length in the first direction X1 of the adjacent seal pattern 40, and the extension length of the second dummy spacer 52 may be substantially the same as the length in the second direction X2 of the adjacent seal pattern 40.

In the scribing process as described below with reference to FIGS. 11 to 17, the scribing line extending in one direction (e.g., the first direction) and the scribing line extending in the other direction (e.g., the second direction) intersecting with the one direction may form an intersection within the cross area CA, and there may be an effect capable of ensuring the uniformity of the scribing lines in the area near the intersection, by preventing the dummy spacer from being located in the area near the intersection.

Meanwhile, each of the first and second dummy spacers 51 and 52 may have a structure in which a plurality of pattern layers is laminated. For example, the first dummy spacer 51 may include a first base pattern 51a as a linear pattern that is disposed on the first base substrate (not illustrated), is located in the first surrounding area SA1 and extends in the first direction X1, and first support patterns 51b as a plurality of protrusion-like patterns of a dot shape that are disposed on the first base pattern 51a and are spaced apart in the first direction X1. In an exemplary embodiment, the first base pattern 51a is formed of the same material as the light-shielding member in the active area AA but may be thicker than the thickness of the light-shielding member, and the first support pattern 51b is formed of the same material as the color filter in the active area AA but may be thicker than the thickness of the color filter. By forming the thicknesses of the base pattern and the support pattern to be thicker than the thicknesses of the light-shielding member and the color filter of the active area, the base pattern and the support pattern may function as a spacer.

Each of the width $W_1$ of the first dummy spacer and the width $W_2$ of the second dummy spacer may be approximately 0.8 mm to 1.1 mm, respectively. The width $W_1$ of the first dummy spacer may be equal to the width $W_{1a}$ of the first base pattern, and the width $W_2$ of the second dummy spacer may be equal to the width of the second base pattern. In an exemplary embodiment, the width $W_1$ of the first dummy spacer and the width $W_2$ of the second dummy spacer may be different from each other. For example, the width $W_1$ of the first dummy spacer may be approximately 1.1 mm, and the width $W_2$ of the second dummy spacer may be approximately 0.8 mm. If the width $W_{SA1}$ of the first surrounding area SA1 is larger than the width $W_{SA2}$ of the second surrounding area SA2, by setting the width $W_1$ of the first dummy spacer 51 to be larger than the width $W_2$ of the second dummy spacer 52, it is possible to more effectively alleviate bending of the substrates.

The shortest separation distance $l_1$ between the first dummy spacer 51 and the seal pattern 40, and the shortest separation distance $l_2$ between the second dummy spacer 52 and seal pattern 40 may be approximately 0.001 times to 0.004 times the width of the dummy spacer, respectively. For example, the shortest separation distance $l_1$ between the first dummy spacer 51 and the seal pattern 40, and the shortest separation distance $l_2$ between the second dummy spacer 52 and the seal pattern 40 may be 2 to 3 μm or approximately 2.5 to 2.9 μm, respectively.

A separation distance $l_3$ between the two first dummy spacers 51 spaced apart in the second direction X2 within the surrounding area SA1 may be approximately 2 times to 3.5 times the width $W_1$ of the first dummy spacer 51. For example, the separation distance $l_3$ between the first dummy spacers may be approximately 0.5 to 2.5 mm or approximately 2 mm. Although it is not illustrated in the drawings, when the plurality of second dummy spacers are disposed to be spaced apart in the first direction X1 within the second surrounding area SA2, the separation distance between the second dummy spacers may also be approximately 0.5 to 2.5 mm or approximately 2 mm. If the ratio of the separation distance of the dummy spacers to the width of dummy spacer is 2 or more, it is possible to form a uniform scribing line, and if the ratio is 3.5 or less, it is possible to effectively alleviate the problem of bending of substrates.

The height $h_1$ of the first and second dummy spacers 51 and 52 may be smaller than the height of the adjacent seal pattern 40. For example, the height $h_1$ of the first and second dummy spacers may be approximately 2 to 3 μm, respectively. Herein, the height of the dummy spacer means a vertical length from the substrate surface on which the dummy spacers are disposed to the highest point of the dummy spacers. For example, if the dummy spacers are made up of the base pattern and the support pattern disposed on base pattern, the height of the dummy spacers may be a vertical length from the bottom surface of the base pattern to the highest portion of the support pattern. By setting the height of the first and second dummy spacers 51 and 52 within the aforementioned range, the dummy spacers may serve as spacers that reduce the distance between the highest portion of the first substrate 10 and the lowest portion of the second substrate 20 in the portion in which the dummy spacers are disposed, which makes it possible to alleviate the problem of bending of the substrates.

The first support pattern 51b may have a regular octagonal pyramid shape which has a regular octagonal bottom surface, but the present disclosure is not limited thereto. The width $W_{1b}$ of the first support pattern may be approximately 20 to 150 μm, and the separation distance $d_{1b}$ between the first support patterns may be approximately 100 μm to 1 mm. Meanwhile, because the second dummy spacer 52 may have substantially the same or similar shape and configuration as the first dummy spacer 51, the detailed description thereof will not be provided.

Hereinafter, a mother substrate according to another exemplary embodiment of the present disclosure will be described. However, in order not to obscure the essence of the present disclosure, the description of the configuration that is substantially identical or similar to the mother substrate according to the exemplary embodiment will not be provided, and this may be clearly understood by a person of ordinary skill in the art from the accompanying drawings.

Figure 5:
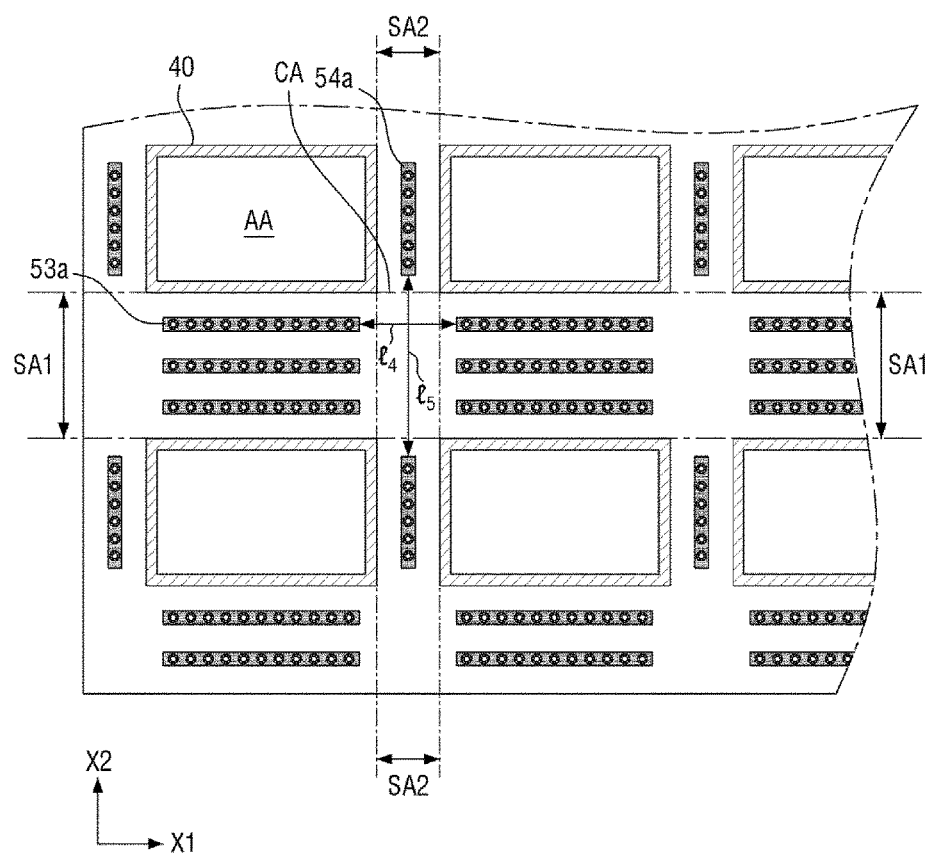
FIG. 5 is a layout diagram of a mother substrate according to another embodiment of the present disclosure.

FIG. 5 is a layout diagram of a mother substrate according to another exemplary embodiment of the present disclosure.

Referring to FIG. 5, first base patterns 53a according to the present exemplary embodiment extends in the first direction X1 within the first surrounding area SA1, and second base patterns 54a extends in the second direction X2 within the second surrounding area SA2. However, the first and second base patterns of the present exemplary embodiment are different from the first and second base patterns of the exemplary embodiments, according to FIGS. 1 to 4, in that an extension length of the first base pattern 53a is less than the length in the first direction X1 of the adjacent seal pattern 40, and an extension length of the second base pattern 54a is also less than the length in the second direction X2 of the adjacent seal pattern 40.

That is, the dummy spacers including the first and second base patterns 53a and 54a may not be located within the cross area CA, and may not be located in areas adjacent to one side and the other side in the first direction X1 of the cross area CA and in areas adjacent to one side and the other side in the second direction X2. The areas in which the dummy spacers are not located may be approximately cross-shaped (+) areas.

In an exemplary embodiment, the maximum length $l_4$ in the first direction X1 of the cross-shaped area is approximately 4 mm or more, or approximately 8 mm or more, and the maximum length $l_5$ in the second direction X2 may be approximately 4 mm or more, or approximately 8 mm or more.

By setting the length $l_4$ in the first direction and the length $l_5$ in the second direction length of the area in which the dummy spacers are not disposed to be included within the aforementioned range, it may be possible to ensure uniformity in the area near the intersection between the scribing lines, it may also be possible to reduce the width of the first surrounding area SA1, the width of the second surrounding area SA2, and the area on the plane of the cross area CA, thereby improving the yield of the unit display panel manufactured from the mother substrate.

Figure 6:
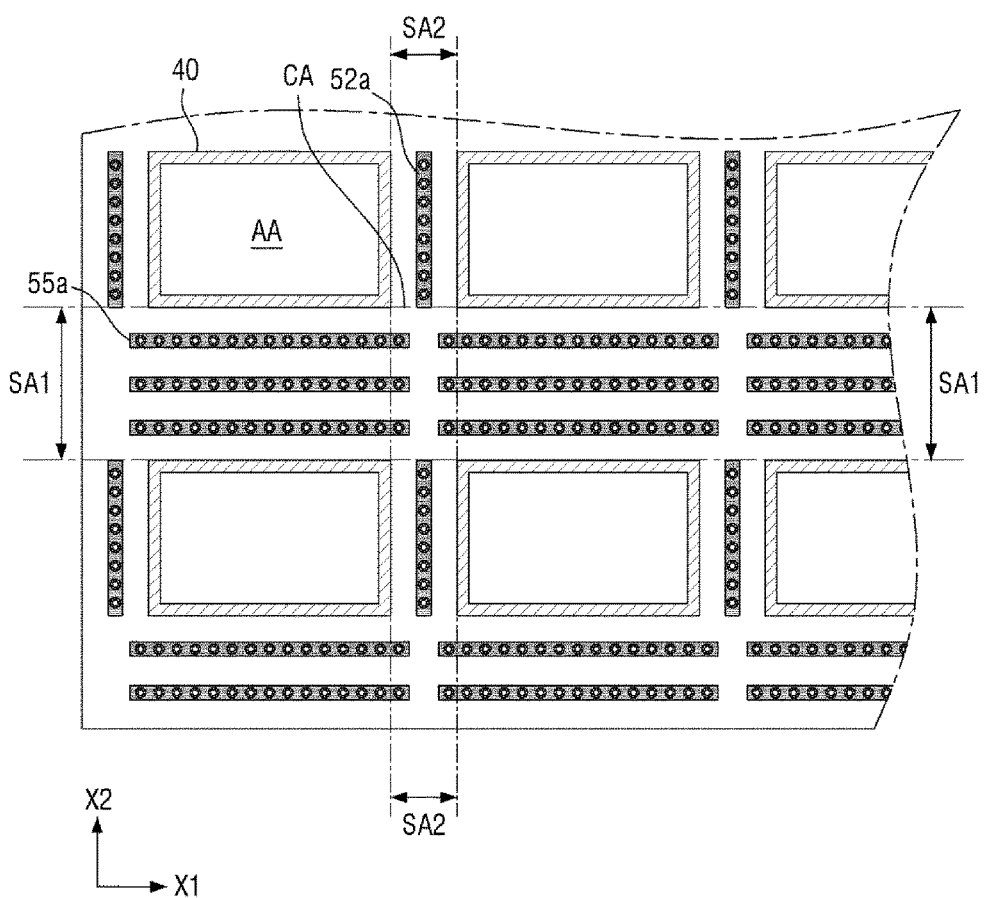
FIG. 6 is a layout diagram of a mother substrate according to still another embodiment of the present disclosure.

FIG. 6 is a layout diagram of a mother substrate according to still another exemplary embodiment of the present disclosure.

Referring to FIG. 6, first base patterns 55a according to the present disclosure may extend in the first direction X1 in the first surrounding area SA1, but may be different from the first dummy spacer of the exemplary embodiments, according to FIGS. 1 to 4, in that the extension length of the first base pattern 55a may be longer than the length in the first direction X1 of the adjacent seal pattern 40, and the average arrangement density of the dummy spacers in the cross area CA may be smaller than the average arrangement density of the dummy spacers in the entire surrounding area SA.

That is, some of the first dummy spacers including the first base pattern 55a may be located in the cross area CA, but the first dummy spacer and the second dummy spacer may be spaced apart from each other without intersecting with each other. Unlike the configuration illustrated in the drawings, the first base pattern 55a in the cross area CA located on the left side and the first base pattern in the cross area CA located on the right side may abut on each other rather than being spaced apart from each other.

The plurality of first dummy spacers extending in the first direction X1 and the second dummy spacers extending in the second direction X2 may be located in the surrounding area SA. Meanwhile, only some of the first dummy spacers extending in the first direction X1 may be located in the cross area CA. Accordingly, a local decrease in arrangement density of the dummy spacers may occur in the cross area CA. Thus, the scribing lines may form the intersection in the cross area CA in which the arrangement density of the dummy spacers is lower than the periphery, and it may be possible to secure the uniformity of the scribing lines in the area near the intersection.

Figure 7:
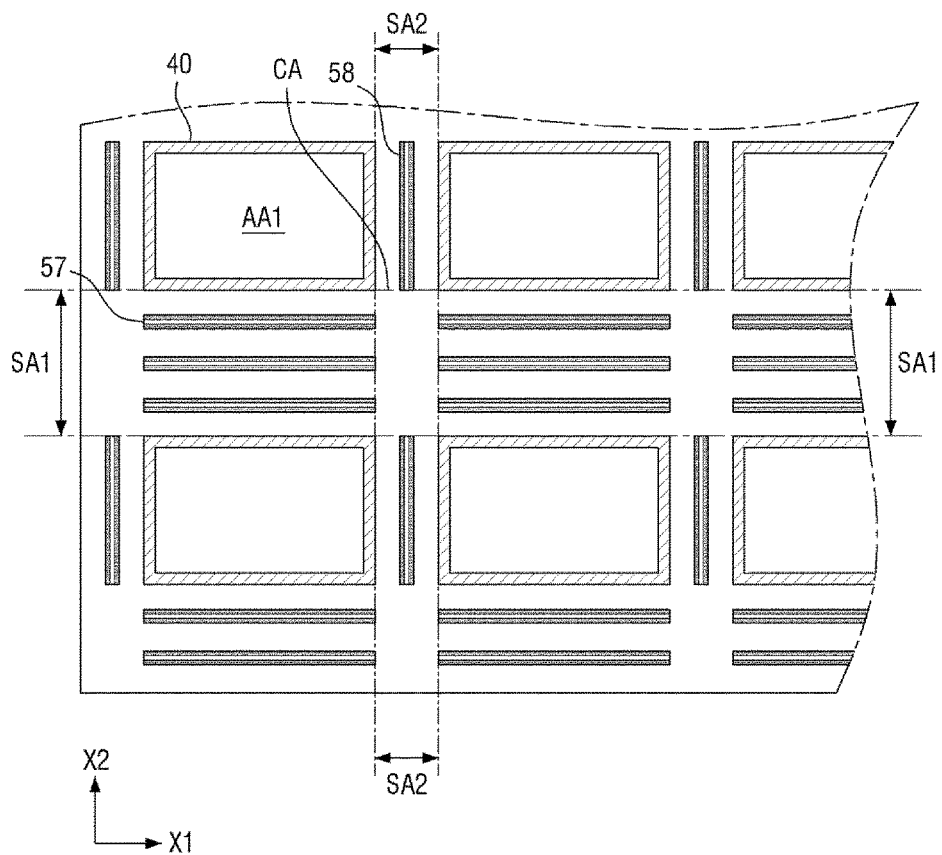
FIG. 7 is a layout diagram of a mother substrate according to still another embodiment of the present disclosure.
Figure 8:
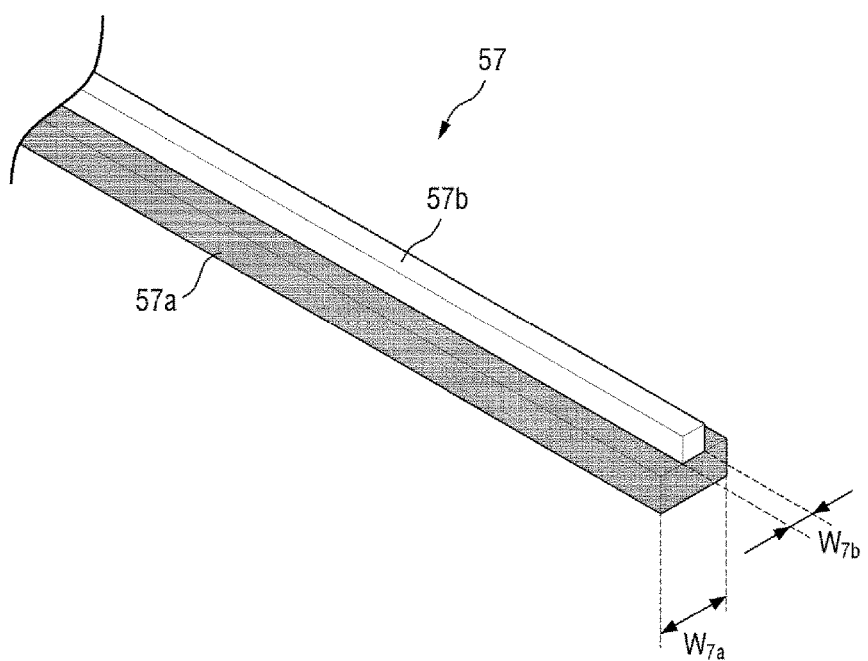
FIG. 8 is an enlarged perspective view of a dummy spacer of FIG. 7.

FIG. 7 is a layout diagram of a mother substrate according to still another exemplary embodiment of the present disclosure. FIG. 8 is an enlarged perspective view of the dummy spacer of FIG. 7.

Referring to FIGS. 7 and 8, first and second dummy spacers 57 and 58 according to the present disclosure have a structure in which a plurality of pattern layers is laminated. The first and second dummy spacers 57 and 58 of the present disclosure may be different from the first and second dummy spacers of the exemplary embodiments according to FIGS. 1 to 4 in that the first dummy spacer 57 may include a first base pattern 57a as a linear pattern that is disposed on the first base substrate (not illustrated), may be located on the first surrounding area SA1 and extend in the first direction X1, and a first support pattern 57b as a linear pattern that may be disposed on the first base pattern 57a and extends in the first direction X1.

In an exemplary embodiment, a width $W_{7a}$ of the first base pattern 57a may be larger than a width $W_{7b}$ of the second support pattern 57b. For example, the width $W_{7A}$ of the first base pattern may be approximately 0.8 to 1.1 mm, and the width $W_{7b}$ of the first support pattern may be approximately 20 μm to 1.1 mm. In another exemplary embodiment, the width of the upper surface of the first base pattern may be substantially the same as the width of the lower surface of the first support pattern. In this case, the cross-sectional shape in the direction perpendicular to the extending direction of the first dummy spacers may be rectangular or trapezoidal shape. Meanwhile, the second dummy spacers 58 may have a shape and configuration that are substantially identical or similar to the first dummy spacers 57.

When the first and second dummy spacers 57 and 58 have a structure in which a plurality of pattern layers are laminated but an upper pattern layer (a support pattern) is a linear pattern, sufficient scribing intensity may be imparted to the first and second dummy spacers. Thus, by forming the scribing lines to overlap the dummy spacer or to penetrate between the two dummy spacers contiguously spaced apart from each other in a scribing process to be described later, it is possible to form a uniform scribing line without a problem of bending of the substrate.

Figure 9:
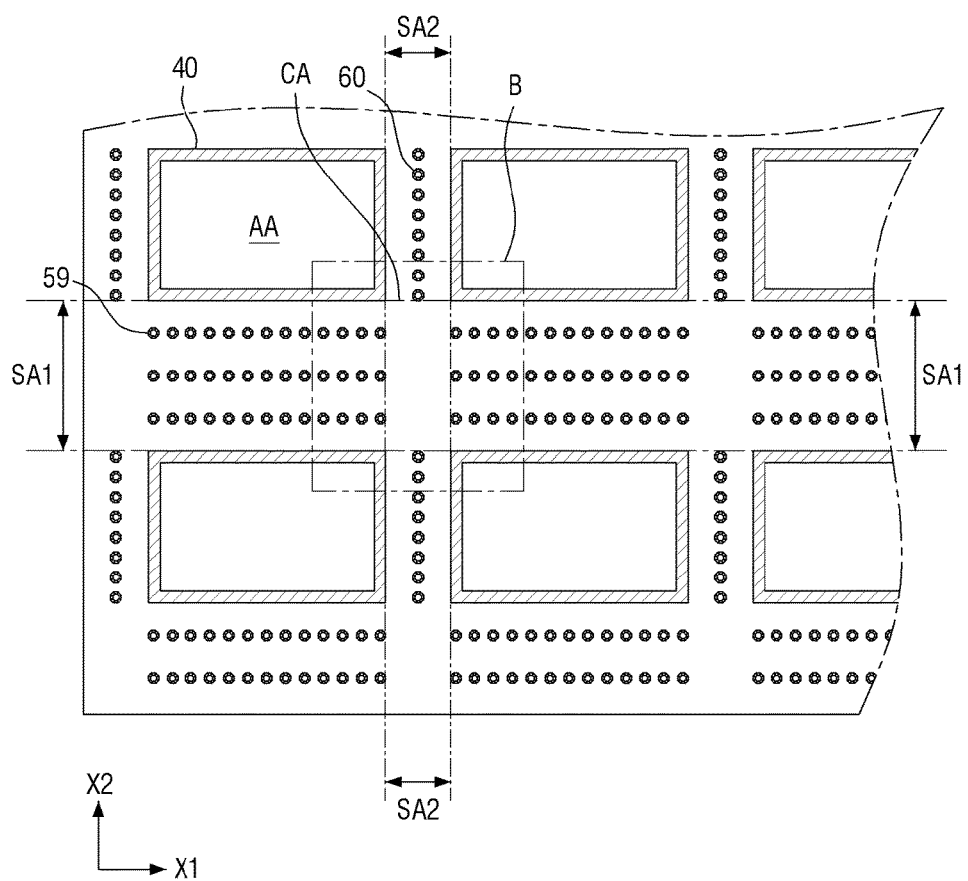
FIG. 9 is a layout diagram of a mother substrate according to still another embodiment of the present disclosure.
Figure 10:
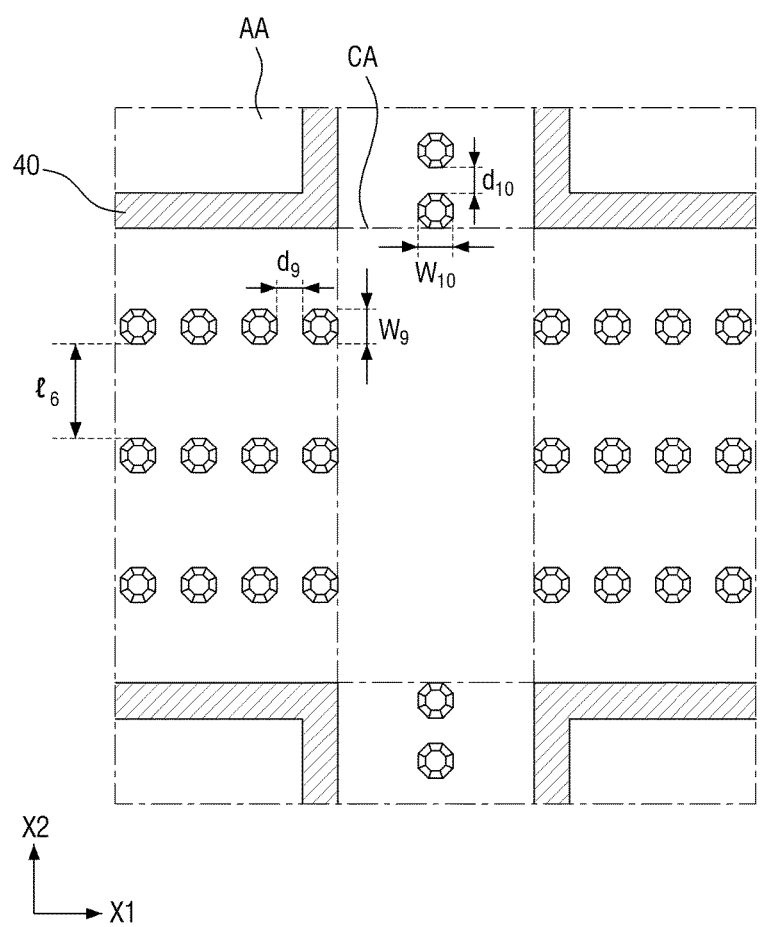
FIG. 10 is an enlarged layout diagram of an area B of FIG. 9.

FIG. 9 is a layout diagram of a mother substrate according to still another exemplary embodiment of the present disclosure. FIG. 10 is an enlarged layout view of an area B in FIG. 9.

Referring to FIGS. 9 and 10, the dummy spacer according to the present embodiment is different from the dummy spacers of the exemplary embodiments according to FIGS. 1 to 4 in that the former includes a plurality of first dummy spacers 59 as a dot-shaped protrusion-like pattern that is located in the first surrounding area SA1, spaced apart from each other in the first direction X1 and the second direction X2 and aligned in a matrix form, and second dummy spacers 60 as a dot-shaped protrusion-like pattern that is located in the second surrounding area SA2, spaced apart from each other in the first direction X1 and the second direction X2 and aligned in a matrix form.

Specifically, the first and second dummy spacers 59 and 60 may have a regular octagonal pyramid shape having a regular octagonal bottom surface, but are not limited thereto, and the first and second dummy spacers 59 and 60 may have a shape such a pillar, a cone, a pyramid and a hemisphere having a circular or polygonal bottom surface.

A width $W_9$ of the first dummy spacer 59 is approximately 20 to 150 µm, a separation distance $d_9$ between the adjacent first dummy spacers in the first direction X1 may be approximately 100 µm to 1 mm, and a separation distance l6 between the adjacent first dummy spacers in the second direction X2 may be approximately 0.5 to 2.5 mm or approximately 2 mm. A width $W_{10}$ of the second dummy spacer 60 may be approximately 20 to 150 µm, and a separation distance $d_{10}$ between the adjacent second dummy spacers in the second direction X2 may be approximately 100 µm to 1 mm.

Unlike the configuration illustrated in FIG. 9 or the like, in some exemplary embodiments, the first dummy spacers may also be protrusion-like patterns which are aligned to be spaced apart in the first direction and the third direction. In this case, an angle formed between the first direction and the third direction may be approximately 30 to 75°. That is, the first dummy spacers may be not be aligned in a matrix, and the adjacent three dummy spacers may be aligned in the approximately triangular form.

Hereinafter, a method for cutting the mother substrate according to an exemplary embodiment of the present disclosure will be described.

Figure 11:
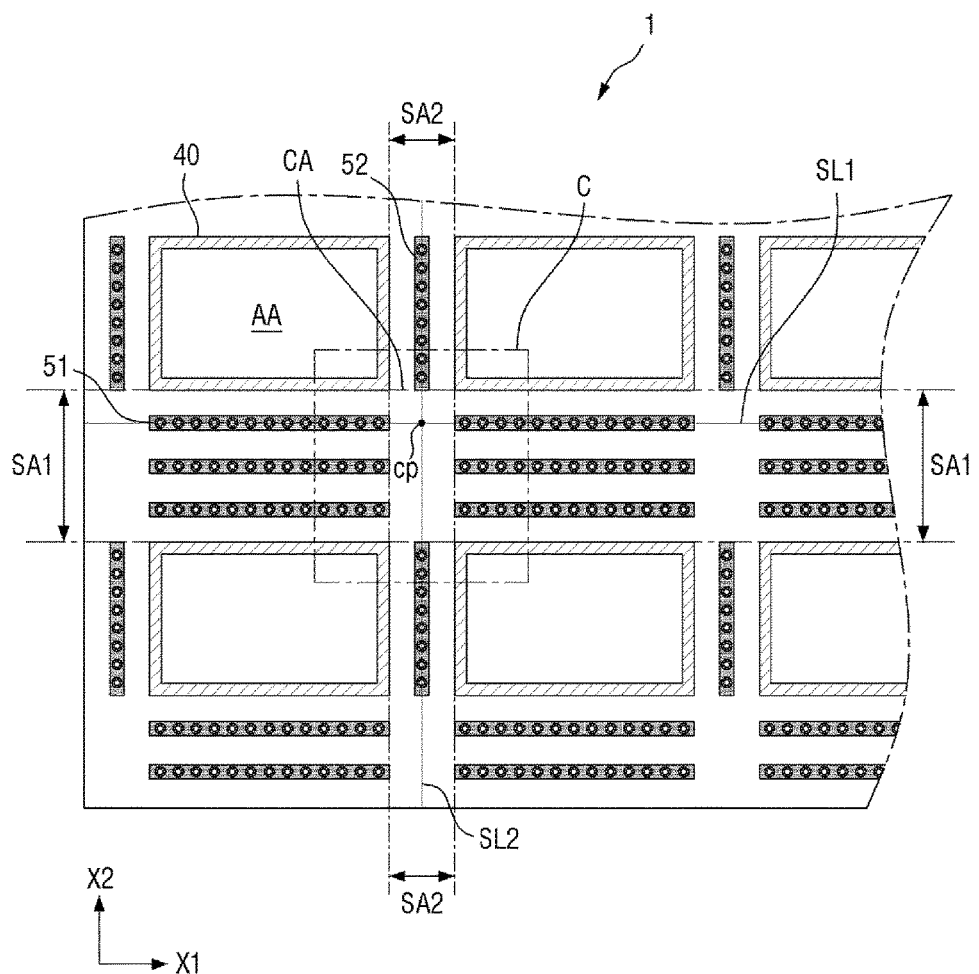
FIGS. 11, 12, 13, and 14 are diagrams for explaining a method of cutting a mother substrate according to an embodiment of the present disclosure.
Figure 12:
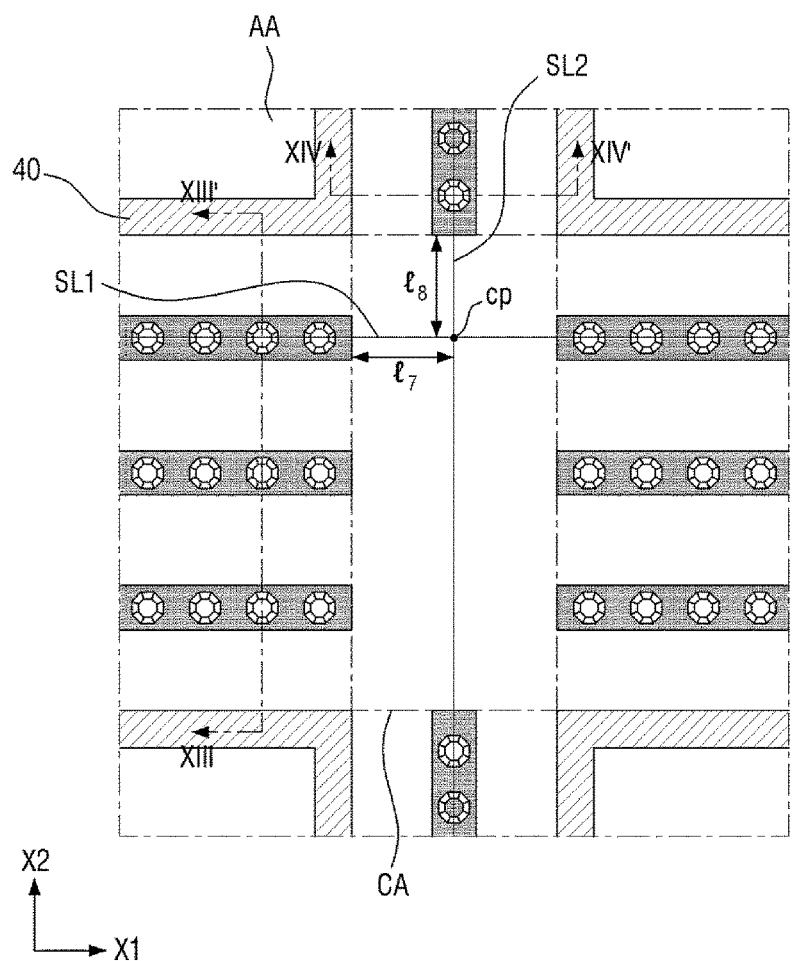
Figure 13:
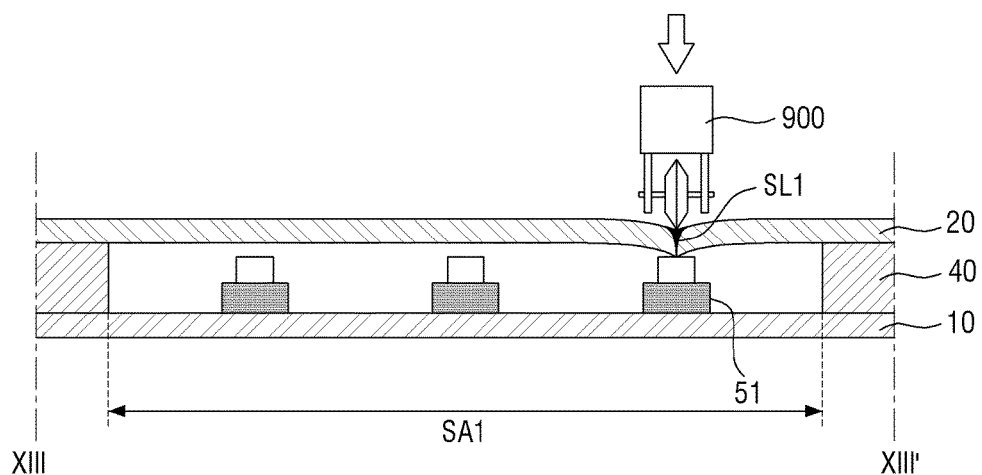
Figure 14:
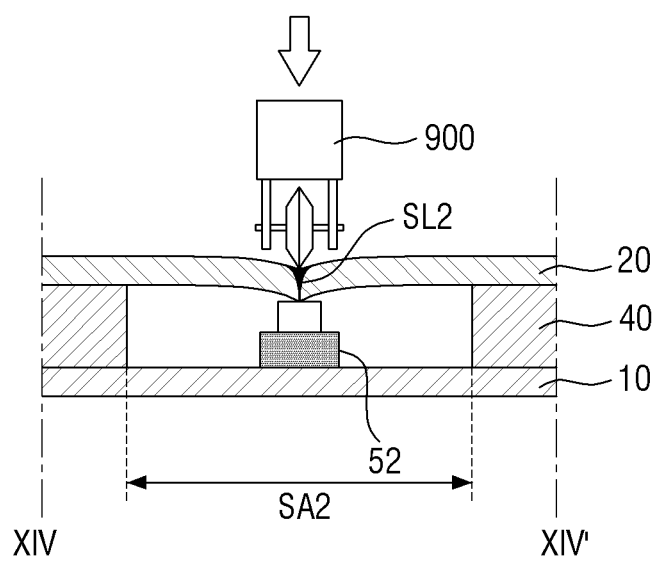

FIGS. 11 to 14 are diagrams for explaining a method for cutting a mother substrate according to an exemplary embodiment of the present disclosure. Specifically, FIG. 11 is a layout diagram of a mother substrate in which the scribing lines are formed, FIG. 12 is an enlarged layout diagram of an area C of FIG. 12, FIG. 13 is a cross-sectional view taken from the line XIII-XIII' of FIG. 12, and FIG. 14 is a cross-sectional view taken from the line XIV-XIV' of FIG. 12.

The method of cutting the mother substrate according to an exemplary embodiment of the present disclosure may include the step of preparing the mother substrate 1, the step of forming the first scribing line SL1 extending in the first direction X1 on one side of the second substrate 20 of the mother substrate 1, and the step of forming the second scribing line SL2 extending in the second direction X2 on one side of the second substrate 20 of the mother substrate 1.

First, referring to FIGS. 11 and 12, the mother substrate 1 according to the aforementioned exemplary embodiments of FIGS. 1 to 4 may be prepared. Since the arrangement, the shape and the like of the components included in the mother substrate 1, has been described above with FIGS. 1 to 4, detailed descriptions thereof will not be provided.

Next, referring to FIGS. 11 to 13, the first scribing line SL1 is formed on one side of the second substrate 20. In this specification, the scribing line means a line on which cracks formed in a direction perpendicular to the substrate surface extend in one direction. The first scribing line SL1 may be formed by extending in the first direction X1 within the first surrounding area SA1 of the mother substrate 1.

In an exemplary embodiment, the first scribing line SL1 may be formed by extending in the first direction X1 to overlap any one of the three first dummy spacers 51 spaced apart in the second direction X2 within the first surrounding area SA1.

In this case, although the surface of the second substrate 20 may receive a pressure in the vertical direction by a cutter 900 for forming the first scribing line SL1, because the first scribing line SL1 overlaps the first dummy spacers 51, the first dummy spacer 51 may support the second substrate 20 from the lower side of the first scribing line SL1, which makes it possible to alleviate bending of the second substrate 20. Further, other first dummy spacers adjacent to the first dummy spacers overlapping the first scribing line SL1 may also support the second substrate 20 on at least one side of the first scribing line SL1.

Next, referring to FIGS. 11, 12, and 14, a second scribing line SL2 may be formed on one side of the second substrate 20. The second scribing line SL2 may extend in the second direction X2 within the second surrounding area SA2 of the mother substrate 1, and may be formed such that an intersection cp intersecting with the first scribing line SL1 is located within the cross area CA in which the first surrounding area SA1 and the second surrounding area SA2 intersect with each other.

In an exemplary embodiment, the second scribing line SL2 may be formed by extending in the second direction X2 to overlap the second dummy spacers 52 located in the second surrounding area SA2.

If the second scribing line SL2 is formed to intersect with the already formed first scribing line SL1, as the cracks are formed in the other direction by the second scribing line in addition to the cracks formed in one direction by the first scribing line, cracks in another unintended direction may be caused in the area near the intersection. Furthermore, because the cracks are already formed by the first scribing line, the second substrate of the area near the intersection is vulnerable to the vertical bending. Accordingly, in the process of the second scribing line intersecting with the intersection, the substrate may be bent and a non-uniform second scribing line may be formed.

According to the mother substrate and the method of cutting the mother substrate according to an exemplary embodiment of the present disclosure, by locating the intersection cp between the first scribing line SL1 and the second scribing line SL2 within the cross area CA in which the first and second dummy spacers 51 and 52 are not located or the average arrangement density of the dummy spacers is a smaller than the entire surrounding area SA, it may be possible to ensure the uniformity of the scribing line in the area near the intersection cp. This may be due to the fact that, because of a change in the arrangement density of the dummy spacers in accordance with the direction of extension of the scribing lines, the vertical depth of the cracks of the scribing line change, but the present disclosure is not limited thereto.

In this case, the shortest separation distance $l_7$ between the intersection cp and the adjacent first dummy spacer 51, and the shortest separation distance $l_8$ between the intersection cp and the adjacent second dummy spacer 52 may be approximately 2 mm or more and 4 mm or less, respectively. If the separation distances $l_7$ and $l_8$ between the intersection cp and the dummy spacer is 2 mm or more, it is possible to secure a sufficient arrangement density difference capable of minimizing the scribing line failure in the area near the intersection cp. Further, if the separation distance is 4 mm or less, the dummy spacers may support the substrate to alleviate bending of the substrate, and it is possible to improve the yield of the unit display panel manufacture from the mother substrate.

Although not illustrated in the drawings, after the step of forming the scribing line on one side of the second substrate 20, a step of forming a plurality of scribing lines on one side of the first substrate 10, and/or a step of applying an impact or load to the vicinity of the scribing line using a brake bar or the like may be further included.

Figure 15:
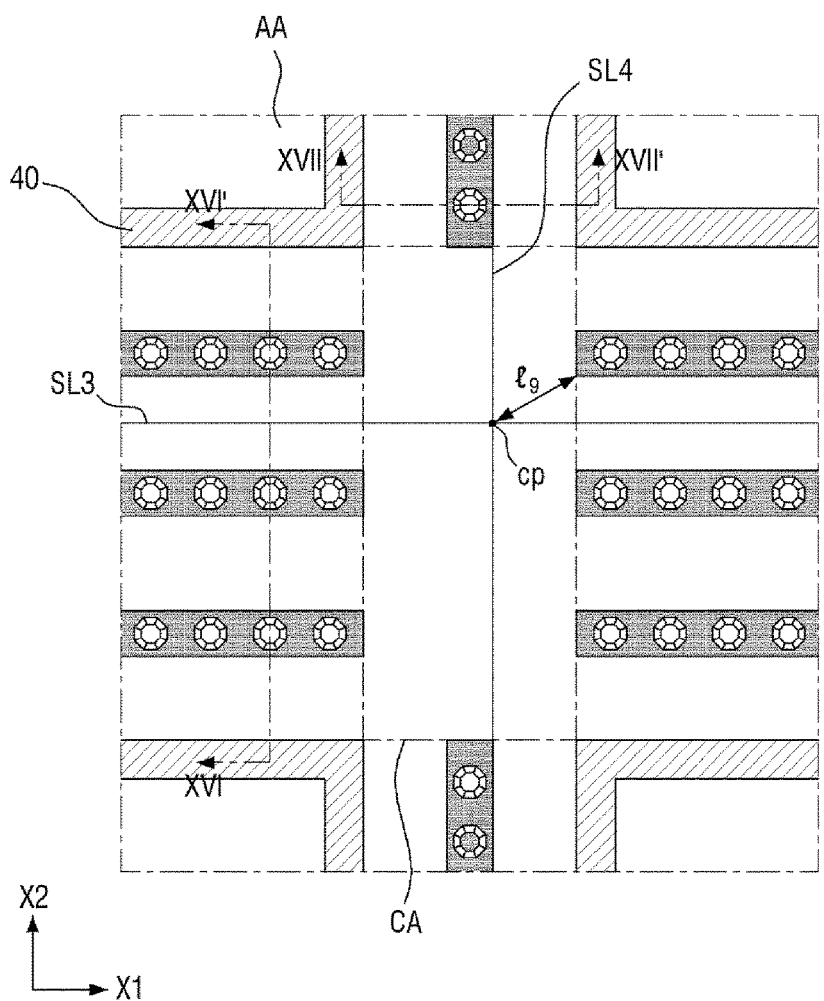
FIGS. 15, 16, and 17 are diagrams for explaining a method of cutting a mother substrate according to another embodiment of the present disclosure.
Figure 16:
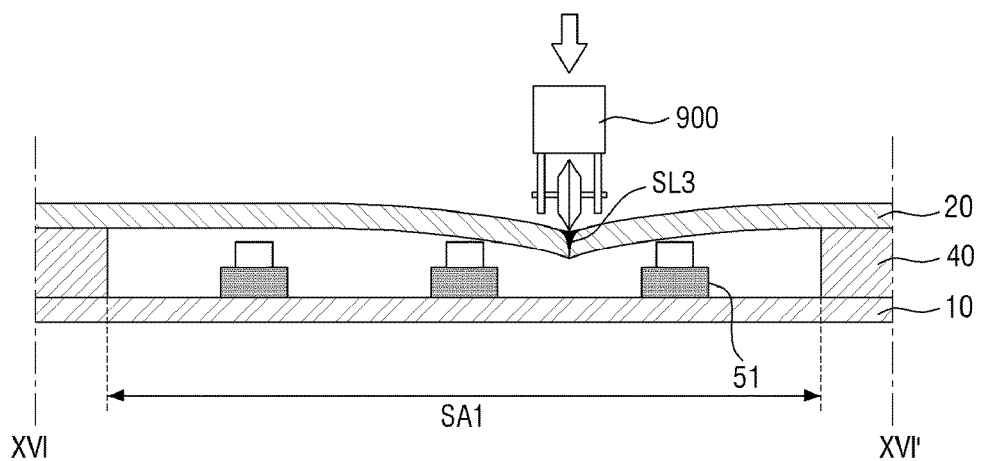
Figure 17:
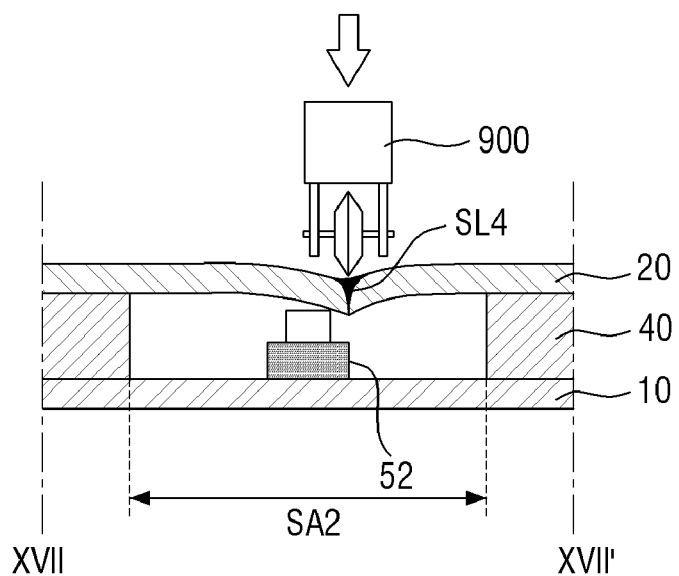

FIGS. 15 to 17 are diagrams for explaining a method of cutting a mother substrate according to another exemplary embodiment of the present disclosure. Specifically, FIG. 15 is an enlarged layout diagram of the mother substrate in which the scribing line is formed, FIG. 16 is a cross-sectional view taken from the line XVI-XVI' of FIG. 15, and FIG. 17 is a cross-sectional view taken from the line XVII-XVII' of FIG. 15.

Referring to FIGS. 15 and 16, a first scribing line SL3 is formed on one side of the second substrate 20. The first scribing line SL3 may be formed to extend in the first direction X1 within the first surrounding area SA1 of the mother substrate 1.

In an exemplary embodiment, the first scribing line SL3 may be formed to extend in the first direction X1 to penetrate between any two of the three first dummy spacers spaced apart in the second direction X2 51 within the first surrounding area SA1.

In this case, although the surface of the second substrate 20 may receive a pressure in the vertical direction by the cutter 900 for forming the first scribing line SL3, because the first scribing line SL3 is formed to penetrate between the two adjacent first dummy spacers 51, the two first dummy spacers 51 may support the second substrate 20 on both sides of the first scribing line SL3, which makes it possible to alleviate bending of the second substrate 20.

Next, referring to FIGS. 15 and 17, the second scribing line SL4 is formed on one side of the second substrate 20. The second scribing line SL4 may extend in the second direction X2 within the second surrounding area SA2 of the mother substrate 1, and may be formed so that the intersection cp intersecting with the first scribing line SL3 may be located within the cross area CA in which the first surrounding area SA1 and the second surrounding area SA2 intersect with each other. FIG. 17 illustrates a case where the second scribing line SL4 is formed to extended in the second direction X2 to be directly adjacent to the second dummy spacer 52, but the present disclosure is not limited thereto, and the second scribing line extends in the second direction X2 to overlap the second dummy spacer, or when the plurality of second dummy spacers is disposed to be spaced apart in the first direction X1 within the second surrounding area SA2, the second scribing line may be formed by extending in the second direction X2 to penetrate between the two adjacent second dummy spacers.

In this case, the shortest separation distance $l_9$ between the intersection cp and the adjacent first dummy spacer 51, and the shortest separation distance between the intersection cp and the adjacent second dummy spacer 52 may be approximately 2 mm or more and 4 mm or less. By setting the separation distance of the intersection cp and the first and second dummy spacers within the aforementioned range, it is possible to secure a sufficient arrangement density difference that is capable of minimizing the scribing line failure in the area near the intersection cp.

Hereinafter, a display panel according to an exemplary embodiment of the present disclosure manufactured by the method of cutting the mother substrate will be described.

Figure 18:
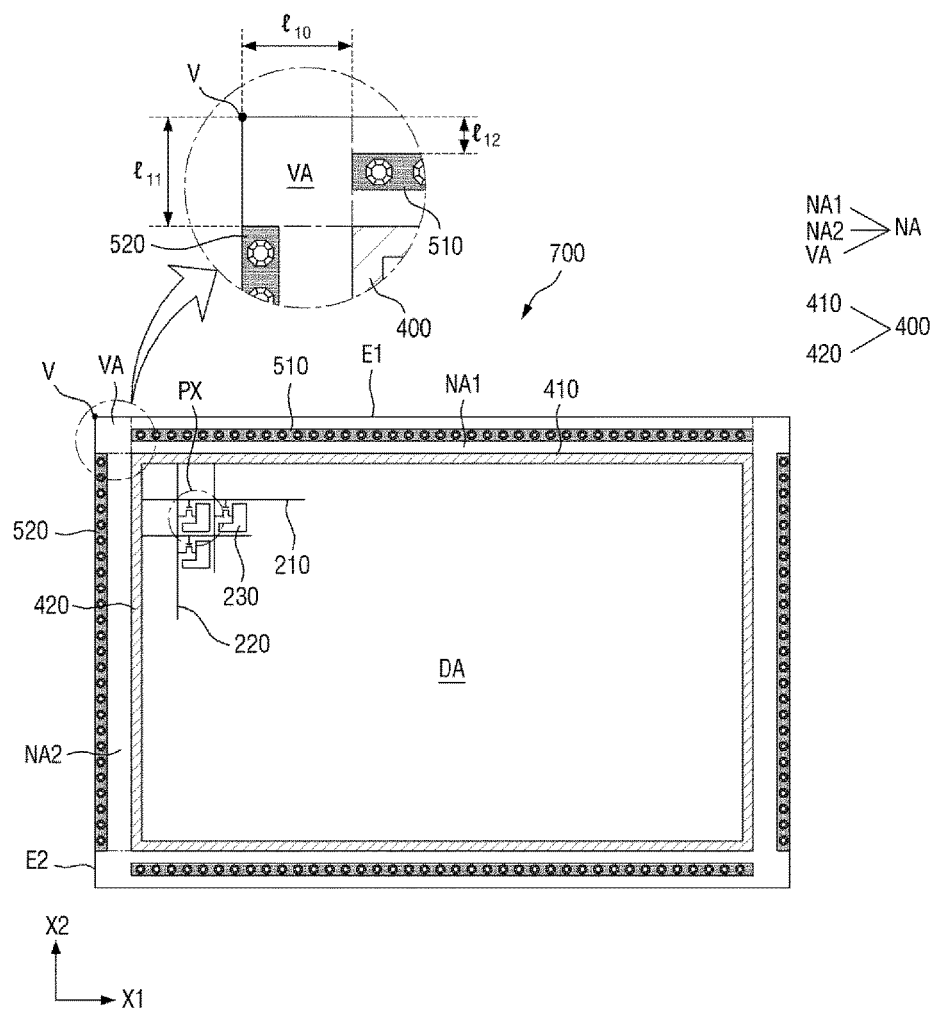
FIG. 18 is a layout diagram of a display panel according to an embodiment of the present disclosure.
Figure 19:
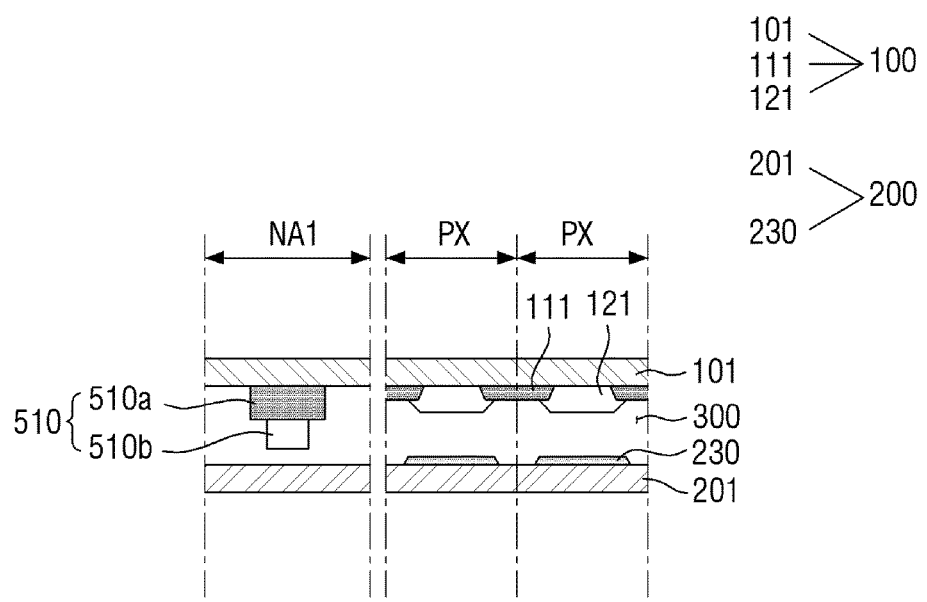
FIG. 19 is a comparative cross-sectional view in which a cross-section of a non-display area and the cross-section of pixel areas of FIG. 18 are compared.

FIG. 18 is a layout diagram of a display panel according to an exemplary embodiment of the present disclosure. FIG. 19 is a comparative cross-sectional view in which the cross-section of the non-display area NA1 of FIG. 18 is compared to the cross-section of the pixel areas PX.

The display panel is a module that displays an image, and may be a liquid crystal display panel, an electrophoretic display panel, an organic light-emitting display panel, a plasma display panel or the like. Hereinafter, although the liquid crystal display panel will be described as an example of the display panel according to an exemplary embodiment of the present disclosure, the display panel is not limited to the liquid crystal display panel. Various display panels and display devices may be used, which may be clearly understood to those of ordinary skill in the art.

Referring to FIGS. 18 and 19, a display panel 700 according to an exemplary embodiment of the present disclosure includes a first substrate 100, a second substrate 200 that includes a plurality of dummy spacers 510 and 520 and faces the first substrate 100 to be spaced apart from each other, a liquid crystal layer 300 that is interposed between the first substrate 100 and the second substrate 200 and includes a liquid crystal layer, and a seal pattern 400 that bonds both the substrates 100 and 200 and seals the liquid crystal layer 300.

The first substrate 100 and the second substrate 200 may include a first edge E1 that extends in the first direction X1, and a second edge E2 that extends in the second direction X2 and forms a single vertex V with the first edge E1. In the exemplary embodiment, the first substrate 100 and the second substrate 200 may be an approximately rectangular-shaped substrate that includes two long sides (e.g., a first edge) and two short sides (e.g., a second edge).

The display area DA, and the non-display area NA that surrounds the display area DA are defined in the display panel 700. The display area DA may be an area in which an image is visually recognized, and the non-display area NA is an area in which no image is visible. The outer shell of the display area DA is surrounded by the non-display area NA.

The seal pattern 400 may be a sealing member for bonding the first substrate 100 and the second substrate 200. The seal pattern 400 may have a shape that corresponds to the shape of the first substrate 100 and/or the second substrate 200. In an exemplary embodiment, the seal pattern 400 may include a first seal pattern 410 which is located in the non-display area NA and extends in the first direction X1 to be adjacent to the first edge E1 and a second seal pattern 420 that is located in the non-display area NA and extends in the second direction X2 to be adjacent to the second edge E2 to a single vertex with the first seal pattern 410. The seal pattern 400 may have a shape that surrounds the display area DA.

The display area DA includes a plurality of pixel areas PX. The plurality of pixel areas PX is disposed in the first direction X1 and the second direction X2, and may be disposed in a substantially matrix form. Each pixel area PX may uniquely display one of the primary colors to achieve a color display. Examples of the primary colors may include red, green, and blue. Further, a switching element (not illustrated) and a pixel electrode 230 may be disposed in each pixel area PX.

The non-display area NA may be a light-shielding area. For example, the non-display area NA may be shielded by overlapping a front chassis (not illustrated) of a display device including the display panel 700. In the second substrate 200 of the non-display area NA, a gate driver (not illustrated) that provides a gate signal to the switching element in the pixel area PX of the display area DA and a data driver (not illustrated) that provides a data signal may be disposed. The non-display area NA may include a first non-display area NA1 between the first seal pattern 410 and the first edge E1, a second non-display area NA2 between the second seal pattern 420 and the second edge E2, and a vertex area VA that abuts on the first non-display area NA1 and the second non-display area NA2 and is adjacent to the vertex V.

Hereinafter, the shape and arrangement of the components in the display panel 700 will be described in more detail.

The first substrate 100 may include a first base substrate 101, a light-shielding member 111, a color filter 121, a first dummy spacer 510, and a second dummy spacer 520.

The first base substrate 101 may be a transparent insulating substrate. For example, the first base substrate 101 may be a silicon substrate, a glass substrate, or a plastic substrate. The light-shielding member 111 may be disposed on the first base substrate 101. For example, the light-shielding member 111 may be a black matrix. The light-shielding member 111 may be disposed in a boundary area between the plurality of pixel areas PX. The color filter 121 may be disposed on the light-shielding member 111 to overlap each pixel area PX. The color filter 121 may be configured to include a substance through which light of a specific wavelength band selectively transmits. For example, the color filter 121 may selectively transmit any one light of red, green or blue, and the color filters that transmit light of different wavelength bands may be disposed for each of the adjacent pixel areas.

A plurality of dummy spacers 510 and 520 may be disposed in the non-display area NA of the first base substrate 101. The plurality of dummy spacers may include one or more first dummy spacers 510 which are located in the first non-display area NA1 and extend approximately in the first direction X1, and one or more second dummy spacers 520 which are located in the second non-display area NA2 and extend approximately in the second direction X2. Although it is not illustrated in the drawings, a plurality of first dummy spacers may be disposed to be spaced apart in the second direction X2 within the first non-display area NA1, or a plurality of second dummy spacers may be disposed to be spaced part in the first direction X1 within the second non-display area NA2. In this case, the separation distance in the second direction X2 between the first dummy spacers, and the separation distance in the first direction X1 between the second dummy spacers may be approximately 0.5 to 2.5 mm or approximately 2 mm.

The average arrangement density of the dummy spacers 510 and 520 in the vertex area VA may be zero. That is, the dummy spacers may not be located in the vertex area VA. Specifically, the first dummy spacer 510 may extend in the first direction X1 within the first non-display area NA1, and the second dummy spacer 520 may extend in the second direction X2 within the second non-display area NA2, but the first dummy spacer 510 and the second dummy spacer 520 may be spaced apart from each other without intersecting with each other. The extension length of the first dummy spacer 510 may be substantially equal to the length of the first seal pattern 410, and the extension length of the second dummy spacers 520 may be substantially equal to the length of the second seal pattern 420.

In an exemplary embodiment, if the first dummy spacer 510 includes a first base pattern 510a which is disposed on the first base substrate 101 and extends in the first direction X1, and a first support pattern 510b disposed on the first base pattern 510a, the first base pattern 510a may be formed of the same material as the light-shielding member 111 through an integral process, and the first support pattern 510b may be formed of the same material as the color filter 121 through an integral process.

Specifically, after providing the light-shielding member material on the first base substrate 101, by patterning the light-shielding member material, the first base pattern 510a and the light-shielding member 111 pattern may be formed. The patterning may utilize a mask process, and may utilize other methods capable of forming a pattern. In this case, the thickness of the first pattern layer 510a may be greater than the thickness of the light-shielding member 111, but the thickness of the first pattern layer 510a may be equal to or smaller than the thickness of the light-shielding member 111. Further, after providing the color filter material thereon, by patterning the color filter material, the first support pattern 510b and the color filter 121 pattern may be formed. In this case, the thickness of the first support pattern 510b may be greater than the thickness of the color filter 121, and the thickness of the first support pattern 510b may be equal to or smaller than the thickness of the color filter 121.

However, the present disclosure is not limited thereto, and in some exemplary embodiments, the dummy spacers may be formed of the same material as a column spacer (not illustrated) in the pixel area PX, may further include other layers such as a protective layer/an insulating layer/an electrode layer, or may be a single layer structure.

The length $l_{10}$ in the first direction X1 of the vertex area VA may approximately 2 mm or more or 4 mm or more, and the length $l_{11}$ in the second direction X2 may be approximately 2 mm or more or 4 mm or more. Specifically, the vertex area VA may include an area in which the distance from the vertex V is less than 2 mm, that is, an area of an approximately quadrant shape having a radius of 2 mm.

Further, the shortest separation distance between the first dummy spacer 510 and the first seal pattern 410 may be approximately 2 to 3 μm or approximately 2.5 to 2.9 μm, and the shortest separation distance $l_{12}$ between the first dummy spacer 510 and the first edge E1 may be approximately 1 mm or less. In another exemplary embodiment, the first dummy spacer and the first edge may be located to abut on each other. Further, the shortest separation distance between the second dummy spacers 520 and the second seal pattern 420 may be approximately 2 to 3 μm or approximately 2.5 to 2.9 μm, and the second dummy spacers 520 and the second edge E2 may be located to abut on each other. In another exemplary embodiment, the second dummy spacer and the second edge may also be spaced apart from each other.

Each of the width of the first dummy spacer and the width of the second dummy spacer may be 0.8 to 1.1 mm. In an exemplary embodiment, the width of the first dummy spacer and the width of the second dummy spacer may be different from each other. For example, the width of the first dummy spacer may be approximately 1.1 mm, and the width of the second dummy spacer may be approximately 0.8 mm.

A plurality of dummy spacers 510 and 520 according to the present exemplary embodiment may be understood such that that when the mother substrate 1 including the dummy spacers described with FIGS. 1 to 4 is cut by the method of cutting the mother substrate described above with FIG. 15 or the like, and at least some of the dummy spacers are left on the display panel. Thus, the specific description of the shape and the size of the first and second dummy spacers 510 and 520 will not be provided.

Next, the second substrate 200 will be described. The second substrate 200 may include a second base substrate 201, a gate line 210, a data line 220 a switching element (not illustrated), and a pixel electrode 230.

The second base substrate 201 may be the same transparent insulating substrate as the first base substrate 101. The gate line 210 and the data line 220 may be disposed on the second base substrate 201. The gate line 210 may extend approximately in the first direction X1, and may electrically connect a control terminal and a gate driver of each switching element within the plurality of pixel areas PX arranged along the first direction X1. The data line 220 may extend approximately in the second direction X2, and may electrically connect an input terminal and a data driver of each switching element within a plurality of pixel areas PX arranged along the second direction X2. Further, the output terminal of the switching element may be electrically connected to the pixel electrode 230. The pixel electrodes 230 may be disposed in each pixel area PX, and each pixel electrode 230 may be in a state of being electrically insulated.

A liquid crystal layer 300 including a liquid crystal may be disposed between the first substrate 100 and the second substrate 200 inside the seal pattern 400. In an exemplary embodiment, the pixel electrode 230 of the second substrate 200 may generate an electric field together with a common electrode (not illustrated) of the first substrate 100, and may achieve the display color of the pixel area PX by controlling the alignment direction of the liquid crystal in the liquid crystal layer 300.

Figure 20:
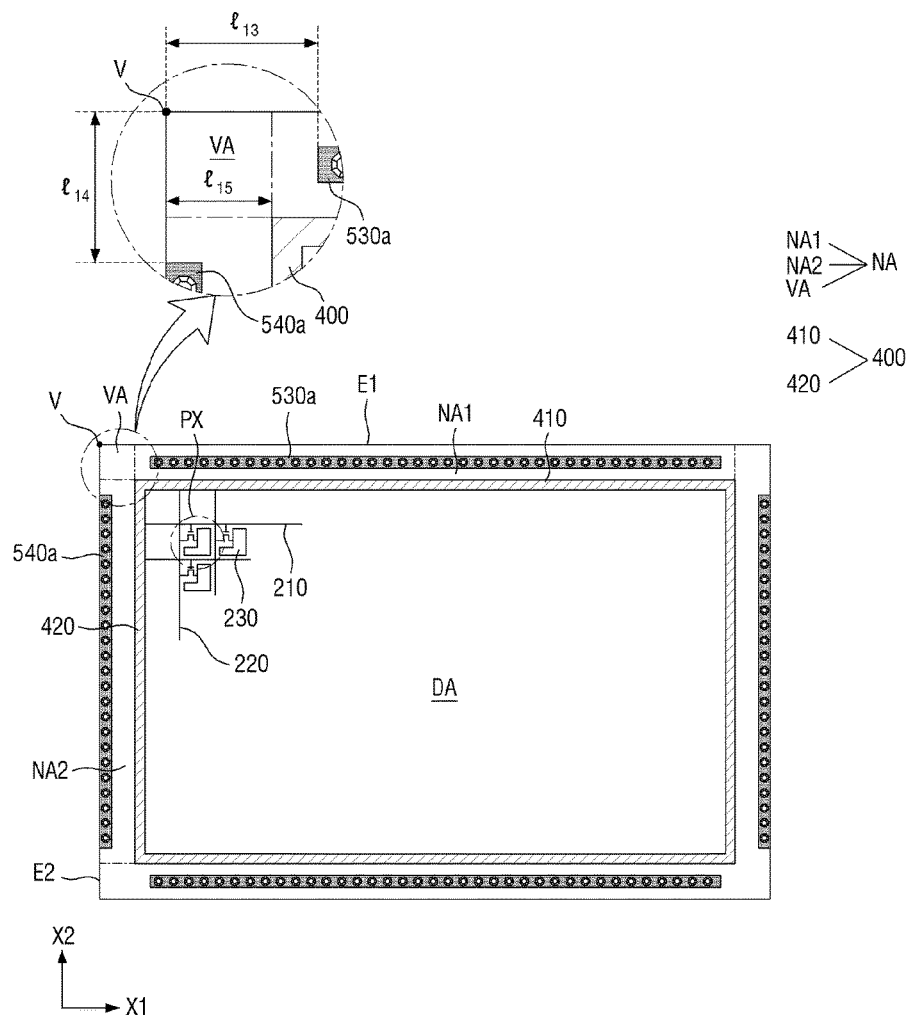
FIG. 20 is a layout diagram of a display panel according to still another embodiment of the present disclosure.

FIG. 20 is a layout diagram of a display panel according to another exemplary embodiment of the present disclosure.

Referring to FIG. 20, the first base pattern 530a according to the present exemplary embodiment may extend in the first direction X1 within the first non-display area NA1, and the second base pattern 540a may extend in the second direction X2 within the second non-display area NA2. However, the first base pattern 530a and the second base pattern 540a are different from the first and second base patterns of the exemplary embodiment according to FIG. 18 in that the extension length of the first base pattern 530a is less than the length of the adjacent first seal pattern 410, and the extension length of the second base pattern 540a is less than the length of the adjacent second seal pattern 420.

That is, the dummy spacers including the first and second base patterns 530a and 540a may not be located within the vertex area VA, and may not be located in an area adjacent to the first direction X1 of vertex area VA and an area adjacent to the second direction X2. The area in which the dummy spacers 530 and 540 are not located may have a shape of approximately "⌈", "⌉", "⌋" or "⌊". For example, a length $l_{13}$ in the first direction X1 of the "⌈" shape may be approximately 2 mm or more or approximately 4 mm or more, and a length $l_{14}$ in the second direction X2 may be approximately 2 mm or more or approximately 4 mm or more.

The plurality of dummy spacers according to the present exemplary embodiment may be understood such that that when the mother substrate described with FIG. 5 is cut, and at least some of the dummy spacers are left on the display panel.

Figure 21:
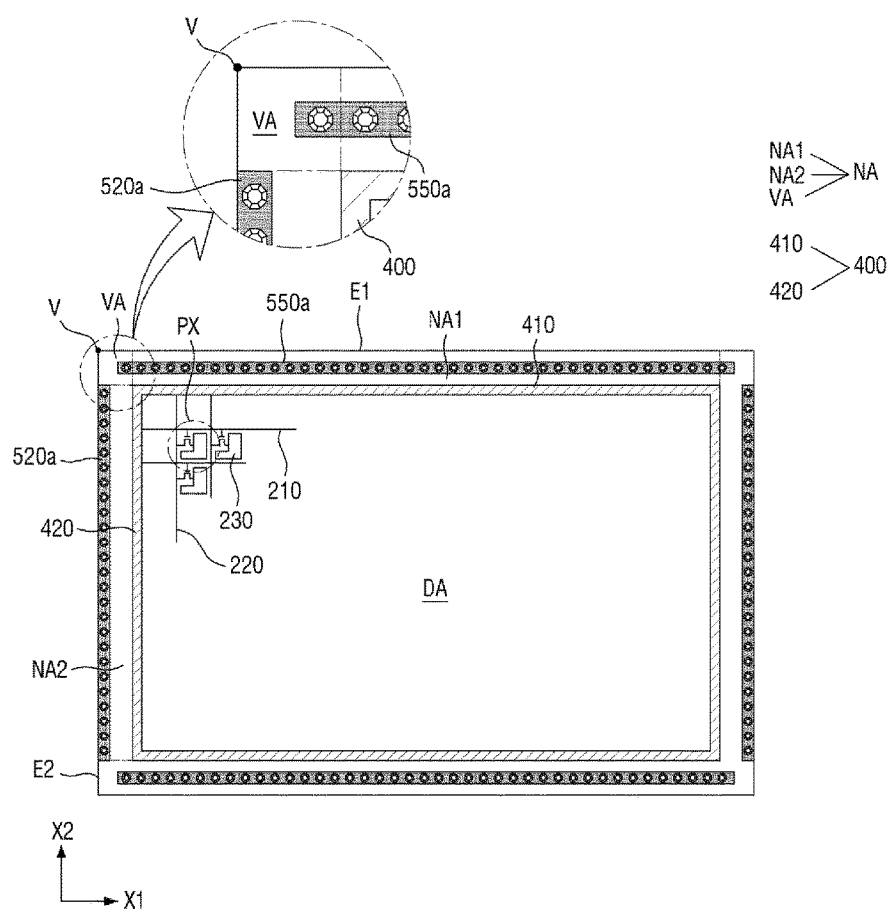
FIGS. 21, 22, and 23 are layout diagrams of the display panel according to still another embodiment of the present disclosure.

FIG. 21 is a layout diagram of a display panel according to still another exemplary embodiment of the present disclosure.

Referring to FIG. 21, a first base pattern 550a according to the present exemplary embodiment extends in the first direction X1 within the first non-display area NA1, but is different from the first dummy spacer of the exemplary embodiment according to FIG. 18 in that the extension length of the first base pattern 550a is longer than the length of the adjacent first seal pattern 410, and the average arrangement density of the dummy spacers in the vertex area VA is smaller than the average arrangement density of the dummy spacers in the entire non-display area NA.

That is, some of the first dummy spacers including the first base pattern 550a may be located in the vertex area VA, but the first dummy spacers and the second dummy spacers may be spaced apart from each other, without mutually intersecting.

Meanwhile, the plurality of dummy spacers according to the present exemplary embodiment may be understood such that that when the mother substrate described with FIG. 6 is cut and at least some of the dummy spacers are left on the display panel.

Figure 22:
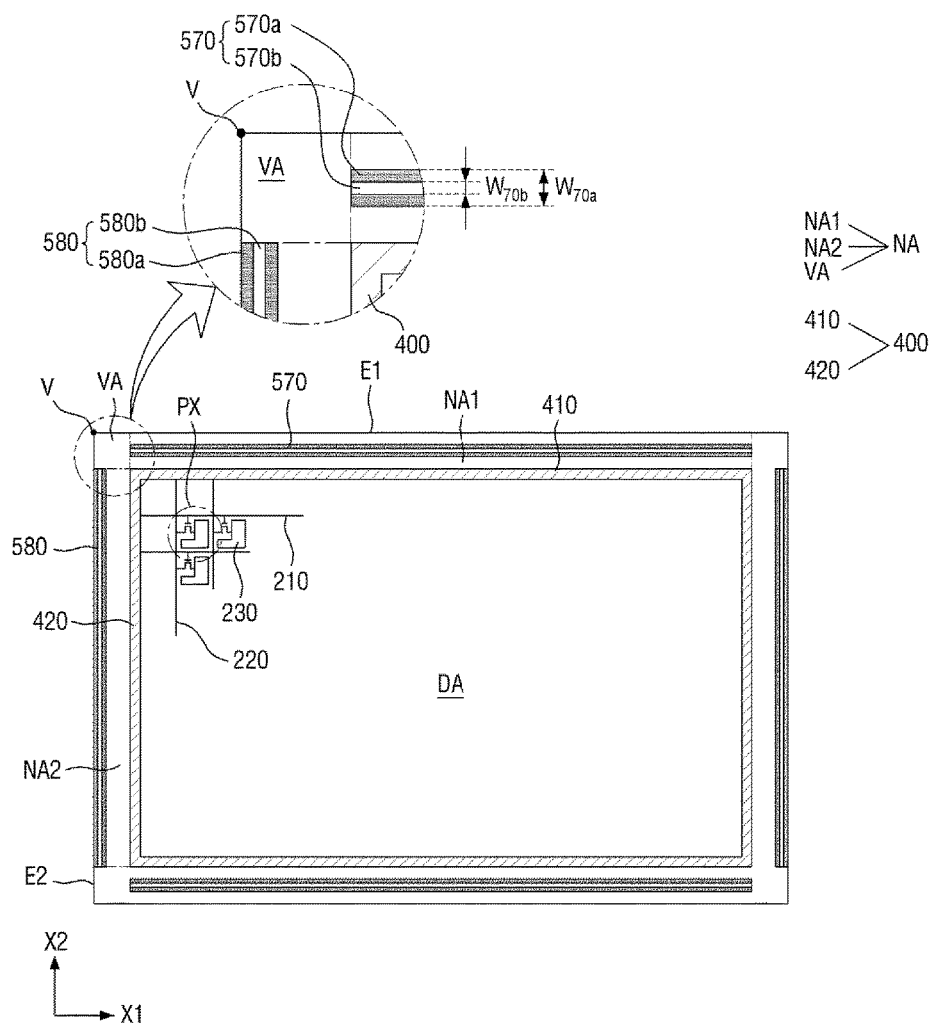

FIG. 22 is a layout diagram of a display panel according to still another exemplary embodiment of the present disclosure.

Referring to FIG. 22, each of first and second dummy spacers 570 and 580 according to the present exemplary embodiment may have a structure in which a plurality of pattern layers is laminated, and, for example, is different from the first and second dummy spacers of the exemplary embodiment according to FIG. 18 in that the first dummy spacer 570 includes a first base pattern 570a as a linear pattern which is disposed on the first base substrate (not illustrated), is located in the first non-display area NA1 and extends in the first direction X1, and a first support pattern 570b as a linear pattern which is disposed on the first base pattern 570a and extends in the first direction X1.

In an exemplary embodiment, a width $W_{70a}$ of the first base pattern 570a may be larger than a width $W_{70b}$ of the first support pattern 570b. For example, the width $W_{70a}$ of the first base pattern may be approximately 0.8 to 1.1 mm, and the width $W_{70b}$ of the first support pattern may be approximately 20 μm to 1.1 mm. In another exemplary embodiment, the width of the upper surface of the first base pattern may also be substantially the same as the width of the lower surface of the first support pattern. For example, the cross-sectional shape in the direction perpendicular to the extending direction of the first dummy spacer may be a rectangular or trapezoidal shape. Meanwhile, the second dummy spacer 580 may have a shape and a configuration that are substantially identical or similar to those of the first dummy spacer 570.

A plurality of dummy spacers 570 and 580 according to the present exemplary embodiment may be understood such that that when the mother substrate mentioned with FIG. 7 is cut, and at least some of the dummy spacers are left on the display panel.

Figure 23:
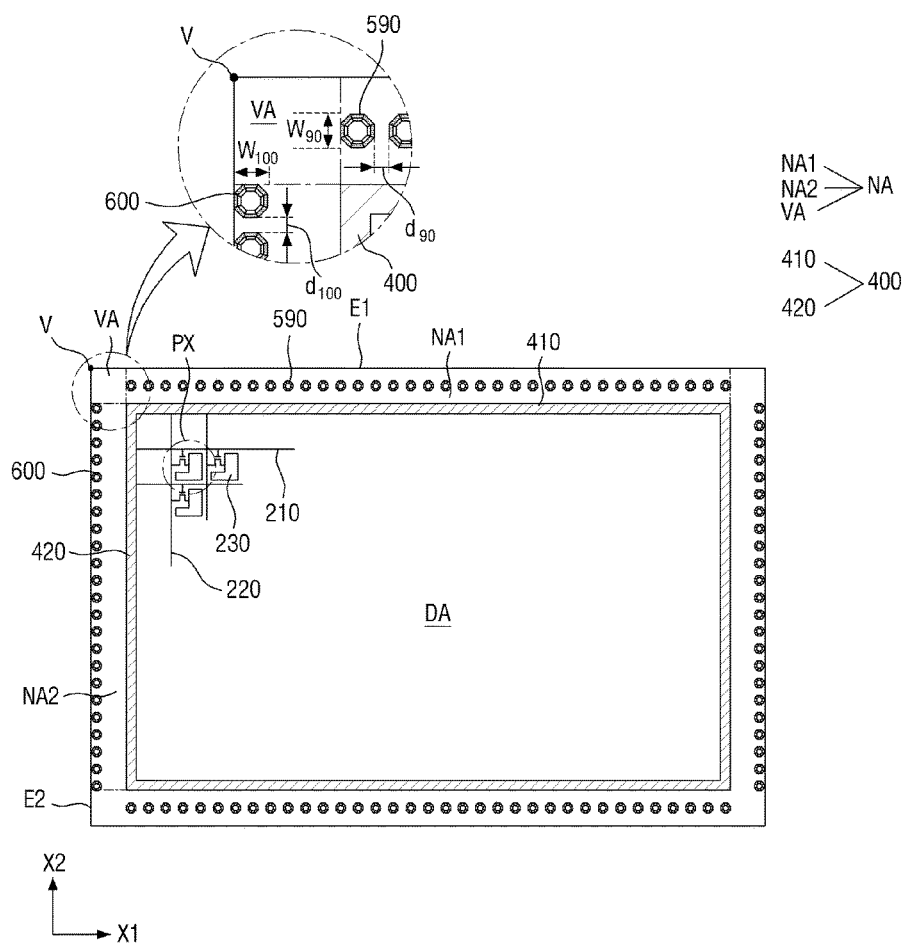

FIG. 23 is a layout diagram of a display panel according to still another exemplary embodiment of the present disclosure.

Referring to FIG. 23, the dummy spacer according to the present exemplary embodiment is different from the dummy spacer of the exemplary embodiment according to FIG. 18 in that the former includes a plurality of first dummy spacers 590 as a dot-shaped protrusion-like pattern that is located in the first non-display area NA1 and spaced apart in the first direction X1, and a plurality of second dummy spacers 600 as a dot-shaped protrusion-like pattern that is located in the second non-display area NA2 and spaced apart in the second direction X2.

Specifically, the first and second dummy spacers 590 and 600 may have an octagonal pyramid shape having a regular octagonal bottom surface, but are not limited thereto, and may have a shape such a pillar, a cone, a pyramid and a hemisphere having a circular or polygonal bottom surface.

Further, a width $W_{90}$ of the first dummy spacer 590 may be approximately 20 to 150 μm, a separation distance $d_{90}$ between the adjacent first dummy spacers in the first direction X1 may be approximately 100 μm or more. Further, a width $W_{100}$ of the second dummy spacer 600 may be approximately 20 to 150 μm, and a separation distance $d_{100}$ between the adjacent second dummy spacers in the second direction X2 may be approximately 100 μm or more.

Meanwhile, the plurality of dummy spacers 590 and 600 according to the present exemplary embodiment may be understood such that that when the mother substrate described with FIG. 9 is cut, and at least some of the dummy spacers are left on the display panel.

Unlike the configuration illustrated in FIG. 23, in some exemplary embodiments, the first dummy spacers may be arranged in a matrix form while being spaced apart in the first direction X1 and the second direction X2, and/or the second dummy spacers may also be arranged in a matrix form while being spaced apart in the first direction X1 and the second direction X2. In this case, the separation distance between the adjacent first dummy spacers in the second direction X2 may be approximately 0.5 to 2.5 mm or approximately 2 mm, and the separation distance between the adjacent second dummy spacers in the first direction X1 may be approximately 0.5 to 2.5 mm or approximately 2 mm.

Figure 24:
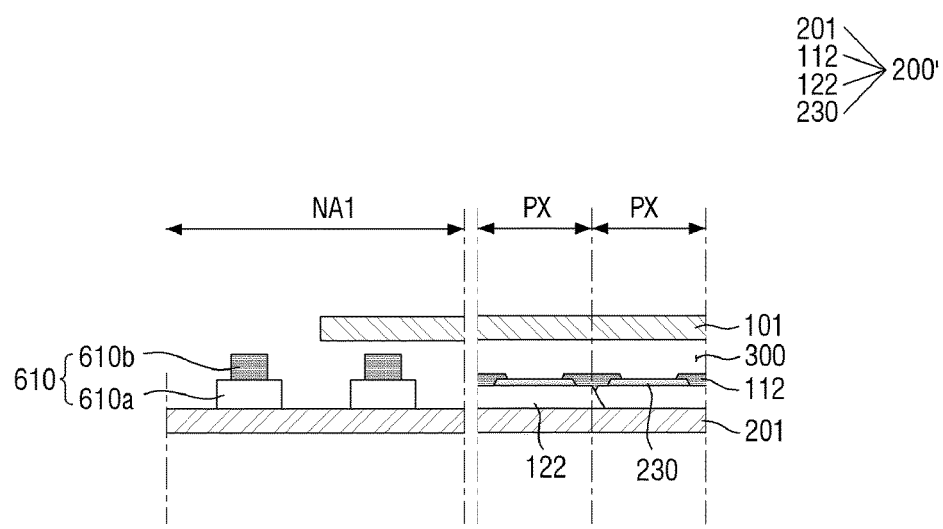
FIG. 24 is a comparative cross-sectional view in which the cross-section of the non-display area of the display panel and the cross-section of the pixel areas according to still another embodiment of the present disclosure are compared.

FIG. 24 is a comparative view in which the cross-section of the non-display area of the display panel is compared to the cross-section of the pixel areas according to still another exemplary embodiment of the present disclosure.

Referring to FIG. 24, a first dummy spacer 610 and a second dummy spacer (not illustrated) according to the present exemplary embodiment are different from the first and second dummy spacers according to exemplary embodiment of FIG. 19 in that the first dummy spacer 610 and the second dummy spacers are disposed on the second base substrate 201, and at least some of the first dummy spacer 610 does not overlap the first base substrate 101.

In an exemplary embodiment, each of the first substrate (the upper substrate) and the second substrate (200', the lower substrate) is a substrate of a rectangular shape including two long sides and two short sides, and the second substrate 200' may have an area on a plane that is larger than the first substrate.

Further, the first substrate may include a first base substrate 101, and the second substrate 200' includes a second base substrate 201, a gate line (not illustrated), a data line (not illustrated), a switching element (not illustrated), a color filter 122, a light-shielding member 112, and a pixel electrode 230. Specifically, a color filter 122 may be disposed on the second base substrate 201 to overlap each pixel area PX, and the pixel electrode 230 may be disposed on the color filter 122. Further, on the pixel electrode 230, the light-shielding member 112 may be disposed at the boundary between the respective pixel areas PX.

If the first dummy spacer 610 includes a first base pattern 610a which is disposed on the second base substrate 201 and extends in the first direction X1, and a first support pattern 610b disposed on the first base pattern 610a, the first base pattern 610a may be formed of the same material as the color filter 122 through an integral process, and the first support pattern 610b may be formed of the same material as the light-shielding member 112 through an integral process. Further, a plurality of first dummy spacers 610 may be disposed to be spaced apart in the second direction X2 between the first edge of the second substrate 200' and the first seal pattern, and at least some of the first dummy spacers may not overlap the first substrate.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display panel comprising:
a display area comprising a plurality of pixels;
a non-display area surrounding the display area;
a first substrate comprising a first edge extending in a first direction and a second edge extending in a second direction which intersects with the first direction and forms a vertex with the first edge;
a second substrate that faces the first substrate;
a seal pattern that comprises a first seal pattern extending in the first direction, and a second seal pattern which extends in the second direction and forms a vertex with the first seal pattern, the seal pattern being located between the first substrate and the second substrate and surrounding the display area; and
one or more dummy spacers disposed on the first substrate within the non-display area,
wherein the non-display area comprises:
a first non-display area between the first seal pattern and the first edge;
a second non-display area between the second seal pattern and the second edge;
a vertex area that abuts the first non-display area and the second non-display area and is adjacent to the vertex of the first substrate; and
an average arrangement density of the dummy spacers in the vertex area is smaller than an average arrangement density of the dummy spacers in the non-display area or 0; and
wherein:
the dummy spacers comprise a first dummy spacer located in the first non-display area and a second dummy spacer located in the second non-display area;
the first dummy spacer comprises a first linear pattern with a first uniform width extending in the first direction and a first support pattern disposed directly on the first linear pattern;
the second dummy spacer comprises a second linear pattern with a second uniform width extending in the second direction;
the first uniform width of the first linear pattern is different from the second uniform width of the second linear pattern;
a width of the first support pattern is smaller than a width of the first linear pattern; and
an extension length of the first linear pattern is equal to a length of the first seal pattern in the first direction, and an extension length of the second linear pattern is equal to a length of the second seal pattern in the second direction.

2. The display panel of claim 1, wherein the first linear pattern is disposed on the first substrate.

3. The display panel of claim 2, wherein the first support pattern comprises a plurality of dot-shaped protrusion-like patterns that are spaced apart in the first direction and disposed directly on the first linear pattern.

4. The display panel of claim 1, wherein at least a part of the first dummy spacer does not overlap the second substrate.

5. The display panel of claim 1, wherein the vertex area comprises an area in which a distance from the vertex of the first substrate is less than 2 mm.

6. The display panel of claim 1, wherein the vertex area further comprises an area in which a distance from the vertex of the first substrate is 4 mm or more or 2 mm or less.

7. The display panel of claim 1, wherein a shortest separation distance between the first dummy spacer and the first edge is 1 mm or less, or the first dummy spacer abuts the first edge.

8. A mother substrate comprising:
a plurality of active areas arranged in a matrix form;
a grid-shaped surrounding area surrounding the active areas;
a first substrate;
a second substrate that faces the first substrate;
a plurality of seal patterns located between the first substrate and the second substrate and surrounding each of the active areas; and
a plurality of dummy spacers disposed on the first substrate within the surrounding area,
wherein:
the surrounding area comprises first surrounding areas which extend in a first direction;
second surrounding areas which extend in a second direction intersecting with the first direction;
an average arrangement density of the dummy spacers in an area in which the first surrounding areas and the second surrounding areas intersect with each other is smaller than an average arrangement density of the dummy spacers in the surrounding area or 0;
lengths of the plurality of dummy spacers disposed in the first surrounding areas are equal to a length of the plurality of seal patterns in the first direction;
lengths of the plurality of dummy spacers disposed in the second surrounding areas are equal to a length of the plurality of seal patterns in the second direction;
the lengths of the plurality of dummy spacers disposed in the first surrounding areas are equal to each other,
the lengths of the plurality of dummy spacers disposed in the second surrounding areas are equal to each other;
each of the plurality of dummy spacers comprises a linear pattern and a support pattern disposed directly on the linear pattern;
a width of the linear pattern is different from a width of the support pattern; and
a first uniform width of each of the linear patterns in the first surrounding areas is different from a second uniform width of each of the linear patterns in the second surrounding areas;
an extension length of each the linear patterns in the first surrounding areas is equal to the length of the plurality of seal patterns in the first direction, and an extension length of each of the linear patterns in the second surrounding areas is equal to the length of the plurality of seal patterns in the second direction.

9. The mother substrate of claim 8, wherein the plurality of dummy spacers comprises a plurality of dummy spacers spaced apart in the second direction within the first surrounding area, and a minimum separation distance between adjacent dummy spacers in the second direction is 2 mm or less.

10. The mother substrate of claim 8, wherein a shortest separation distance between the plurality of dummy spacers and one of the seal patterns is 3 mm or less.

\* \* \* \* \*